US011219094B2

(12) United States Patent
Lee et al.

(10) Patent No.: US 11,219,094 B2
(45) Date of Patent: Jan. 4, 2022

(54) METHOD AND DEVICE FOR MULTI-SERVICE IN WIRELESS COMMUNICATIONS SYSTEM

(71) Applicant: Samsung Electronics Co., Ltd., Suwon-si (KR)

(72) Inventors: Hoyeon Lee, Seongnam-si (KR); Sunghoon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/060,882

(22) PCT Filed: Dec. 9, 2016

(86) PCT No.: PCT/KR2016/014433
§ 371 (c)(1),
(2) Date: Jun. 8, 2018

(87) PCT Pub. No.: WO2017/099514
PCT Pub. Date: Jun. 15, 2017

(65) Prior Publication Data
US 2018/0338347 A1    Nov. 22, 2018

(30) Foreign Application Priority Data

Dec. 9, 2015  (KR) .................. 10-2015-0174931

(51) Int. Cl.
*H04W 88/18* (2009.01)
*H04W 4/10* (2009.01)
(Continued)

(52) U.S. Cl.
CPC ....... *H04W 88/182* (2013.01); *H04L 65/1006* (2013.01); *H04L 65/1069* (2013.01);
(Continued)

(58) Field of Classification Search
CPC .......... H04W 4/90; H04W 4/10; H04W 4/12; H04W 4/20; H04W 88/02; H04W 88/182;
(Continued)

(56) References Cited

U.S. PATENT DOCUMENTS 6,519,335 B1 * 2/2003 Bushnell ............... H04M 1/663
379/208.01
7,343,153 B1 * 3/2008 Kauhanen ............. H04W 76/15
455/416
(Continued)

FOREIGN PATENT DOCUMENTS

CN         102100091 A    6/2011
CN         102356684 A    2/2012
(Continued)

OTHER PUBLICATIONS

European Patent Office, "Supplementary European Search Report," Application No. EP16873379.8, dated Nov. 6, 2018, 9 pages.
(Continued)

*Primary Examiner* — Mehmood B. Khan

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to various embodiments, a method for operating a server may comprise the steps of: while at least one service is connected to a terminal, receiving, from another device, a request for providing a first service to the terminal; determining, in response to the request, whether it is possible to provide the first service to the terminal; when
(Continued)

the first service cannot be provided, determining whether to terminate one of the at least one service; and, if the one of the at least one service is terminated, transmitting a setup message for the first service to the terminal in response to the termination.

15 Claims, 22 Drawing Sheets

(51) Int. Cl.
| | |
|---|---|
| *H04W 88/02* | (2009.01) |
| *H04W 4/12* | (2009.01) |
| *H04W 4/90* | (2018.01) |
| *H04W 76/10* | (2018.01) |
| *H04L 29/06* | (2006.01) |
| *H04W 4/20* | (2018.01) |

(52) U.S. Cl.
CPC .............. *H04L 65/80* (2013.01); *H04W 4/10* (2013.01); *H04W 4/12* (2013.01); *H04W 4/203* (2013.01); *H04W 4/90* (2018.02); *H04W 76/10* (2018.02); *H04W 88/02* (2013.01); *H04W 88/18* (2013.01)

(58) Field of Classification Search
CPC ..... H04W 76/10; H04W 4/203; H04W 88/18; H04L 65/1006; H04L 65/1069; H04L 65/80
See application file for complete search history.

(56) References Cited

U.S. PATENT DOCUMENTS

| | | | | |
|---|---|---|---|---|
| 8,279,868 | B2* | 10/2012 | Martinez | H04W 92/02 |
| | | | | 370/392 |
| 9,591,124 | B2* | 3/2017 | Corretjer | H04W 4/90 |
| 10,225,847 | B2* | 3/2019 | Chae | H04W 72/1247 |
| 10,264,623 | B2* | 4/2019 | Lee | H04W 4/02 |
| 10,405,227 | B2 | 9/2019 | Jeong et al. | |
| 2006/0067287 | A1* | 3/2006 | Kim | H04L 65/4061 |
| | | | | 370/338 |
| 2007/0197248 | A1 | 8/2007 | Reich et al. | |
| 2010/0016008 | A1* | 1/2010 | Brewer | H04W 4/10 |
| | | | | 455/518 |
| 2010/0248771 | A1* | 9/2010 | Brewer | H04W 72/10 |
| | | | | 455/518 |
| 2011/0261685 | A1* | 10/2011 | Hayashi | H04W 72/10 |
| | | | | 370/229 |
| 2012/0226804 | A1* | 9/2012 | Raja | H04L 43/028 |
| | | | | 709/224 |
| 2012/0233624 | A1* | 9/2012 | Niimura | G06F 9/485 |
| | | | | 718/103 |
| 2012/0238307 | A1 | 9/2012 | Grannan | |
| 2013/0084911 | A1 | 4/2013 | Chang | |
| 2013/0310056 | A1* | 11/2013 | Cabrera | H04W 8/18 |
| | | | | 455/450 |
| 2013/0339529 | A1 | 12/2013 | Rizzo et al. | |
| 2014/0162700 | A1 | 6/2014 | Zhang | |
| 2015/0098321 | A1* | 4/2015 | Jeong | H04W 76/50 |
| | | | | 370/230 |
| 2015/0172339 | A1* | 6/2015 | Park | H04L 65/4084 |
| | | | | 709/219 |
| 2015/0230070 | A1* | 8/2015 | Kadiyala | H04W 4/16 |
| | | | | 455/417 |
| 2016/0147644 | A1* | 5/2016 | Sisinni | G06F 11/3438 |
| | | | | 717/131 |
| 2016/0150455 | A1* | 5/2016 | Suryavanshi | H04W 4/10 |
| | | | | 455/436 |
| 2017/0006078 | A1* | 1/2017 | Leung | H04M 7/0072 |
| 2017/0063936 | A1* | 3/2017 | Waas | H04L 47/70 |
| 2018/0048701 | A1* | 2/2018 | Iwami | H04W 92/18 |
| 2018/0110054 | A1* | 4/2018 | Jung | H04W 72/085 |

FOREIGN PATENT DOCUMENTS

| | | |
|---|---|---|
| CN | 103888911 A | 6/2014 |
| CN | 104160762 A | 11/2014 |
| EP | 2747510 A1 | 6/2014 |
| KR | 10-2011-0030691 A | 3/2011 |
| KR | 10-2013-0103428 A | 9/2013 |
| KR | 10-2017-0002255 A | 1/2017 |
| WO | 2010111420 A1 | 9/2010 |
| WO | 2017003175 A1 | 1/2017 |

OTHER PUBLICATIONS

The First Office Action dated Nov. 6, 2020 in connection with Chinese Application No. 201680078353.0, 16 pages.
Blackberry UK Ltd, "Simultaneous Sessions—Procedures," S6-150371 (revision of S6-15xxxx), 3GPP TSG-SA WG6 Meeting #4, Fukuoka, Japan, May 25-29, 2015, 9 pages.
Blackberry UK Ltd, "Simultaneous Calls," S6-150615 (revision of S6-15xxxx), 3GPP TSG-SA WG6 Meeting #5 Seoul, Korea, Jul. 6-10, 2015, 11 pages.
Communication pursuant to Article 94(3) EPC in connection with European Application No. 16873379.8 dated Aug. 19, 2020, 8 pages.
Intellectual Property India, "Examination report under sections 12 & 13 of the Patents Act" dated Mar. 15, 2021, in connection with Indian Patent Application No. 201817022844, 7 pages.
China National Intellectual Property Administration, "The Second Office Action" dated May 10, 2021, in connection with Chinese Patent Application No. CN201680078353.0, 15 pages.
ISA/KR, International Search Report and Written Opinion of the International Searching Authority, International Application No. PCT/KR2016/014433, dated Feb. 28, 2017, 11 pages.
Korean Intellectual Property Office, "Notice of Preliminary Rejection" dated Aug. 29, 2021, in connection with Korean Patent Application No. KR10-2015-0174931, 14 pages.

* cited by examiner

METHOD AND DEVICE FOR MULTI-SERVICE IN WIRELESS COMMUNICATIONS SYSTEM

CROSS-REFERENCE TO RELATED APPLICATIONS AND CLAIM OF PRIORITY

This application is a 371 National Stage of International Application No. PCT/KR2016/014433, filed Dec. 9, 2016, which claims priority to Korean Patent Application No. KR 10-2015-0174931, filed Dec. 9, 2015, the disclosures of which are herein incorporated by reference in their entirety.

BACKGROUND

1. Field

The present disclosure relates generally to a multi-service, and more particularly, to a method and an apparatus for simultaneously providing a multi-service in a specific situation.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, Public Safety Long Term Evolution (PS-LTE) provides a service capable of performing communication for public safety to users in a disaster situation through a Mission Critical Push To Talk over LTE (MCPTT) technology. Accordingly, a terminal is required to simultaneously provide several services, and may expand a function such that several services can be simultaneously performed through the MCPTT technology not only in a disaster situation but also in a commercial service.

SUMMARY

Based on the above-described discussion, the present disclosure provides a method and an apparatus for efficiently providing a plurality of voice services in a terminal and a network.

According to various embodiments of the present disclosure, a method of operating a server includes: receiving a request for providing a first service to a terminal from another device while at least one service is connected to the terminal; determining whether the first service can be provided to the terminal in response to the request; when one of the at least one service is terminated, determining whether to terminate one of the at least one service when the first service cannot be provided; and when one of the at least one service is terminated, transmitting a setup message for the first service to the terminal in response to the termination.

According to various embodiments of the present disclosure, a method of operating a terminal includes: receiving a notification message for a first service from a server; determining whether the first service can be provided in response to the notification message; when the first service cannot be provided, determining whether to terminate one of at least one service connected to the terminal; when one of the at least one service is terminated, transmitting an invitation message for the first service to the server in response to the termination; and receiving a setup completion message corresponding to the invitation message.

According to various embodiments of the present disclosure, a server includes: a receiver configured to receive a request for providing a first service to a terminal from another device, a controller configured to determine whether the first service can be provided to the terminal in response to the request and determine whether to terminate one of at least one service connected to the terminal, and a transmitter configured to, when one of the at least one service is terminated, transmit a setup message for the first service to the terminal in response to the termination.

According to various embodiments of the present disclosure, a terminal includes: a receiver configured to receive a notification message for a first service from a server, a controller configured to determine whether the first service can be provided in response to the notification message and, when the first service cannot be provided, determine whether to terminate one of at least one service connected to the terminal, and a transmitter configured to, when one of the at least one service is terminated, transmit an invitation message for the first service to the server in response to the termination and receive a setup completion message corresponding to the invitation message.

According to an apparatus and a method according to various embodiments of the present disclosure, a terminal or a server can manage service request information and, when a service being performed currently is terminated, a connection to the next service can be set.

Effects which can be acquired by the present disclosure are not limited to the above described effects, and other effects that have not been mentioned may be clearly understood by those skilled in the art from the following description.

BRIEF DESCRIPTION OF THE DRAWINGS

For more complete understanding for the present disclosure, the following description will be made with reference to the accompanying drawings. In the drawings, the same reference numerals indicate the same elements.

DETAILED DESCRIPTION

Figure 1:
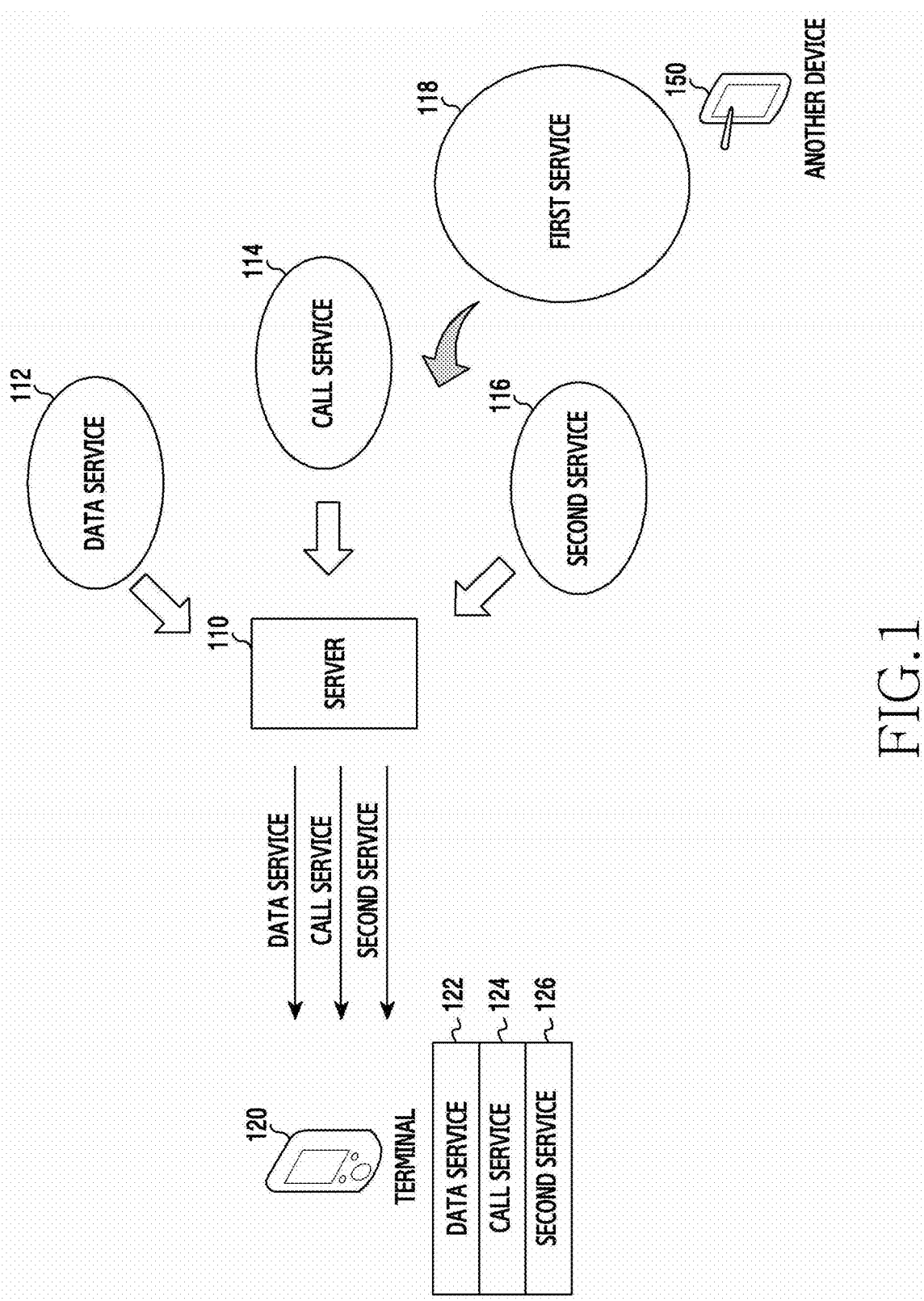
FIG. 1 illustrates a relation between a terminal and a server that support a multi-service.

Hereinafter, the operational principle of the present disclosure will be described in detail with reference to the accompanying drawings. In describing various embodiments below, a detailed description of related known configurations or functions incorporated herein will be omitted when it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Hereinafter, the present disclosure describes a technology for providing a multi-service in a wireless communication system.

The terms referring to control information used in the following description, the terms referring to a multi-antenna signal processing scheme, the terms referring to a state change (for example, termination of a service or an event), the terms referring to a transmitted signal, the terms referring to network entities, the terms referring to messages (for example, a notification message, an invitation message, and a setup message), and the terms referring to an element of a device are only examples for convenience of description. Accordingly, the present disclosure is not limited to the following terms and other terms having the same technical meaning may be used.

Further, the detailed description of embodiments of the present disclosure will be made mainly based on an IP Multimedia Subsystem (IMS) and a User Equipment (UE) standardized by a 3rd Generation Partnership Project (3GPP) and a Session Initiation Protocol (SIP) of the Internet Engineering Task Force (IETF), but the main subject of the present disclosure can be applied to other communication systems having a similar technical background with little modification without departing from the scope of the present disclosure, which may be determined by those skilled in the art.

Public Safety Long Term Evolution (PS-LTE) provides a service capable of performing communication for a disaster situation or public safety to users through a Mission Critical Push To Talk over LTE (MCPTT) technology. MCPTT is one of the technologies defined by 3GPP, and may provide functions such as group communication between users, one-to-one communication, emergency call, disaster notification, and ambient listening.

An MCPTT service includes a UE, an Evolved Packet System (EPS), a Session Initiation Protocol (SIP) core, and an MCPTT application server. The EPS may be a Long Term Evolution (LTE) network, and the SIP core may be an IMS as a network device using the SIP. The MCPTT service may be arranged in various structures. An MCPTT service provider may operate all of the EPS, the SIP core, and the MCPTT application server, or the MCPTT service provider may operate the SIP core and the MCPTT application service and link with the EPS of another service provider to provide the service. Further, the MCPTT service provider may operate only the MCPTT application server and link with the EPS and the SIP core of another service provider to provide the service.

Functional elements of the MCPTT service may be largely divided into group management, session control, and media control. In the group management, subscription information of a group to which a user belongs, a group priority, an allowed role within the group, and a call type which can be used within the group are managed. In the session control, a signal for a call session of registering a user in the MCPTT service, and initiating, changing, or terminating a group call is controlled. All session management signals transmitted by the MCPTT user are controlled/managed through the MCPTT application server.

In the media control, permission for transmission/reception of media sent by the user to use a group call, a one-to-one call, or a disaster notification, and resources are controlled. All pieces of media information sent by the MCPTT user are delivered to another user through a media gateway provided by the MCPTT service. A group management service for group management may be located together with the MCPTT application service, and is logically distinguished depending on a function. The media gateway for media control may be connected to the UE, the EPS, and the MCPTT application server without passing through the SIP core. The media gateway may control a user's transmission/reception right, which may be referred to as floor control. The media gateway may be located together with the MCPTT application server, which is a logically distinguished function.

The MCPTT service may be largely divided into a group call, a one-to-one call, and an emergency notification. The group call may support a normal group call for providing a group call for public safety, an emergency call capable of providing communication with the top priority when an emergency/urgent situation occurs, and an imminent peril call capable of providing a group call in case of an imminent emergency/urgent situation having a lower priority than the emergency call. The one-to-one call may support a normal call, an emergency call, and an ambient listening function by which an ambient sound of the other party can be heard.

MCPTT users may be divided into a plurality of categories. The MCPTT users may be divided into an (unofficial) normal MCPTT user, an official MCPTT user, and an official MCPTT service provider. The MCPTT user may receive a service from a plurality of MCPTT service providers. The MCPTT user may link to an MCPTT service provider having a partnership other than the main MCPTT service provider, so as to perform group communication and one-to-one communication with an MCPTT user having the partnership. The MCPTT UE may receive basic information for receiving an MCPTT service from the MCPTT service provider. The MCPTT UE may receive a user identifier, a group identifier, a role within a group and a call type allowed in the group, whether a one-to-one call is possible, an arrangement type, information to be reported to an MCPTT server, an EPS for supporting various arrangement types, an SIP core, and information for access to an MCPTT application server.

The MCPTT service provider may simultaneously provide and control a plurality of voice services. However, the number of voice services, which can be simultaneously provided, is limited. The present disclosure proposes a method of simultaneously providing a plurality of voice services based on the limited number of voice services. In the MCPTT system, a simultaneous service providing method and process for a user, a group, and a service may be proposed. Further, a process, an apparatus, and a system required for a method of controlling a service by the UE and the server to simultaneously provide services may be proposed. In addition, a message flow to simultaneously provide services may be proposed.

Various embodiments of the present disclosure may consider an MCPTT technical field in an application field thereof. When the MCPTT technology is applied, various embodiments of the present disclosure relate to simultaneous service provision to an MCPTT user, group, and service, and provide a UE and server operation process based on the processing method described in the present disclosure. According to various embodiments of the present disclosure, the user may simultaneously provide a plurality of voice services not only in a disaster safety situation but also in a normal commercial service environment.

A technical problem to be solved by the present disclosure is to simultaneously provide a plurality of services by a single UE. That is, according to various embodiments of the present disclosure, it is possible to provide a method and an apparatus for simultaneously providing a plurality of services in a wireless communication system. Unlike the conventional art in which, when a new service appears after the number of services, which can be supported, is exceeded, the new service cannot be provided, the present disclosure may provide a method and an apparatus for storing information on the new service and, when resources, which can be supported, are generated, connecting the resources to the server to receive the new service.

When there is a limit on the services which the UE can simultaneously receive, due to the restriction of UE capability or network resources, the server or the UE according to various embodiments may manage services, which are being currently performed, and may be controlled to process a service to be performed next. The server or the UE according to various embodiments may simultaneously provide services and also provide a Quality of Service (QoS)-guaranteed service. In the conventional art, when a new call request is received, the call cannot be set and connected if there is a limit on the number of calls which can be simultaneously supported. However, the server or UEs according to various embodiments of the present disclosure cannot set and connect the call, but may manage information on the new call request and, when the call, which is currently being performed, is terminated, set the next call unlike the conventional art.

The server or the UE according to various embodiments are required to consider the number of services, which can be simultaneously provided, as restrictions. For example, various embodiments provide a process, an apparatus, and a system required for a method by which, when one UE can simultaneously provide 10 voice services, if the UE receives 10 voice service requests or more, the UE and the network effectively manage the voice services and efficiently provide the voice services. The voice service may be 1:1 communication (a private call) or a group call. Further, in the method, the apparatus, and the system, a media bearer may be set through half duplex communication unlike the conventional voice service.

Another technical problem to be solved by the present disclosure is to simultaneously provide a plurality of services by a single UE. According to an embodiment of the present disclosure, when a plurality of services are simultaneously performed in the UE, media transmission/reception can be controlled for each service through the correlation with another service, and requirements of a service provider can be satisfied through such a transmission control. Restrictions that should be additionally considered are the media transmission control of simultaneously performed services. When a plurality of services are performed in a single UE, it is required to control the number of transmissions and receptions of media for each service. That is, according to various embodiments of the present disclosure, it is possible to expand a function to control media transmission of simultaneously provided services in the UE.

Another technical problem to be solved by the present disclosure is to propose a differentiated UE UI based on the technical restrictions (limit on the number of voices which can be simultaneously provided and limit on the number of media transmissions/receptions for each service). That is, according to various embodiments of the present disclosure, a UI of the UE for simultaneously providing services may be defined.

FIG. 1 illustrates a relation between a UE and a server that support a multi-service. The UE or the server that supports the multi-service may mean that a plurality of services are simultaneously supported and connected to each other through the UE or the server.

Referring to FIG. 1, the server 110 may provide a plurality of services to the terminal 120. The plurality of services may include a data service 112, a call service 114, and a second service 116. The terminal 120 may be a terminal which supports a multi-service. Unless mentioned differently, it is assumed that the terminal 120 may simultaneously support 3 services in this document. The terminal 120 may simultaneously receive 3 services from the server 110. A service list performed by the terminal 120 includes a data service 122, a call service 124, and a second service 126. Since the terminal 120 can support 3 services and currently receives 3 services, the terminal 120 may have difficulty in receiving more services while maintaining the current services. A maximum number of services supported by the terminal 120 may vary depending on a hardware capability of the terminal and a number of allocable bearers.

When a request for providing a new service to the terminal 120 is transmitted from another device 150 to the server 110, the server 110 may be connected to a total of 4 service requests. The new service may be a first service 118. However, since the terminal 120 currently receives 3 services, the terminal 120 may have difficulty in additionally receiving the first service 118 while maintaining the current services. Accordingly, the server 110 or the terminal 120 is required to wait for termination of at least one of the 3 current services or to terminate at least one service in order to receive the first service 118.

For example, the case where at least one service should be terminated may include an emergency situation including a disaster situation. The following description will be described based on an assumption of a disaster safety situation. However, various embodiments of the present disclosure can be applied to a situation in which a user can simultaneously provide several voice services in a general commercial service environment as well as a disaster safety situation.

When the disaster safety situation is considered, the server 110 may be a server that supports MCPTT in a disaster safety network system. The first service 118 may be a service for a disaster situation or public safety. The disaster safety network system may provide a service capable of performing communication for the disaster situation or public safety to users through the MCPTT technology. MCPTT is one of the technologies defined by 3GPP, and may provide functions such as group communication between users, one-to-one communication, emergency call, disaster notification, and ambient listening.

Figure 2:
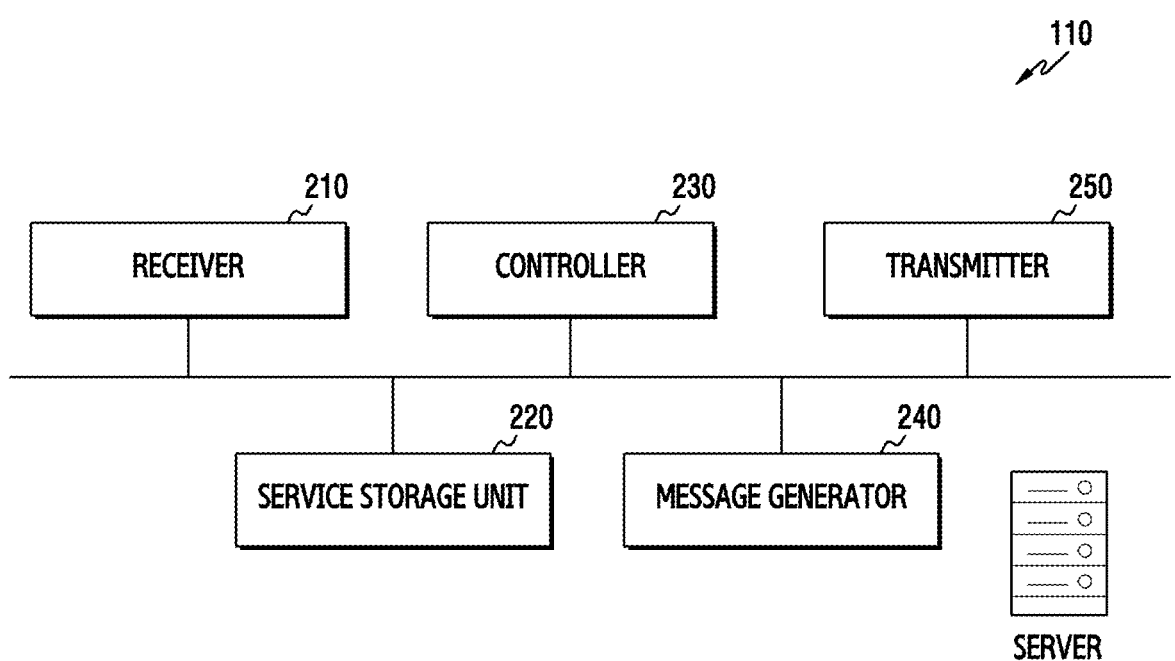
FIG. 2 is a functional block diagram of the server according to various embodiments.

FIG. 2 is a functional block diagram illustrating a server according to various embodiments. The term "~unit" or "~er" used hereinafter may refer to the unit for processing at least one function or operation and may be implemented in hardware, software, or a combination of hardware and software. Referring to FIG. 2, the server 110 may include a receiver 210, a service storage unit 220, a controller 230, a message generator 240, and a transmitter 250.

The receiver 210 performs functions for transmitting/receiving a signal through a wireless channel. For example, the receiver 210 performs a conversion function between a Radio Frequency (RF) signal and a baseband signal according to a physical layer standard of a system. For example, in data reception, the receiver 210 receives an RF signal through at least one antenna, processes the RF signal, down-converts the RF signal into a baseband signal, and then converts the baseband signal into a digital signal. For example, the receiver 210 may include a reception filter, an amplifier, a mixer, an oscillator, a Digital to Analog Convertor (DAC), an Analog to Digital Convertor (ADC), and the like. When a plurality of reception antennas are prepared, the receiver 210 may include a plurality of RF chains.

The receiver 210 may receive, from another device, a request for providing a service from the other device to the terminal. For example, the service may have the form of providing and making a request for data, or the form of making a request for a call. The receiver 210 may transmit the request to the service storage unit 220 or the controller 230.

The service storage unit 220 may be non-volatile memory including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), other types of optical storage devices, or a magnetic cassette. Alternatively, the service storage unit 220 may be a memory configured by a combination of some or all of them.

The service storage unit 220 may store information on the request received by the receiver 210. That is, the service storage unit 220 may store information on a service corresponding to the request. The service storage unit 220 may store information on a plurality of services being provided to the terminal as well as the service corresponding to the request. When the controller 230 makes a request for information on a particular service, the service storage unit 220 may transmit the information to the controller 230.

Based on the number of services being provided to the terminal, the controller 230 may determine whether there is a service to be provided to the terminal. The controller 230 may manage the number of services which can be simultaneously supported by the terminal. The controller 230 may select one of the services being provided to the terminal and the services to be provided to the terminal. Between a service having the lowest priority among the services being provided to the terminal and the services to be provided to the terminal, the controller 230 may select a service having the lowest priority. When the service to be provided to the terminal is selected from the services, the controller 230 may terminate the services being provided to the terminal. The controller 230 may determine whether at least one of the services being provided to the terminal is terminated.

The message generator 240 may generate a message to be transmitted to the terminal according to the operation of the controller 230. The message generator 240 may generate an SIP message. An SIP is the current international standard that is widely used, and adopted as a technology for providing an Internet phone service of a national information communication service. In order to transmit a real-time voice service, a video, text, and a photo between terminals through an IP network, the SIP may be used for exchanging capabilities between the terminals, determining a codec, and reserving network resources. The SIP may be used for establishing a session. When network resources are completely reserved after a codec and a data path to be used between terminals are determined, it may be considered that the session has been established. Devices supporting the SIP through the established session may provide a real-time voice service (Voice over IP) and a multimedia service. SIP messages used in various embodiments of the present disclosure are shown in the following table.

TABLE 1

| Request message | RFC No. |
| --- | --- |
| INVITE | RFC 3261 |
| SUBSCRIBE | RFC 6665 |
| NOTIFY | RFC 6665 |
| REFER | RFC 3515 |

The SIP messages may include SIP INVITE, SIP SUBSCRIBE, SIP NOTIFY, and SIP REFER. Through a Request For Comments (RFC) document, the SIP messages are described, and detailed document numbers are as shown in [Table 1].

The SIP INVITE message may be a message for a setup to a next service. The SIP INVITE message may be a message for establishing a session with the service and joining in the session. An electronic device that received the SIP INVITE message may transmit a message of "200 OK" indicating that the session has been completely established in response to the SIP INVITE message.

The SIP SUBCRIBE message is a message that is requested in advance to check a particular event. After the SIP SUBCRIBE message, the SIP NOTIFY and SIP REFER messages may be used. The SIP NOTIFY message may be used for responding to a particular event, and the SIP REFER message may be used for communicating with a terminal other than the currently communicating terminal.

As described above, the message generator 240 may generate the SIP messages, but is not limited thereto.

When the controller 230 determines termination, the message generator 240 may generate a new message in response to the termination. The new message may correspond to a service to be newly provided to the terminal. The service may be the first service 118 of FIG. 1. The message generator 240 may generate a notification message for the service. The notification message may be the SIP NOTIFY message or the SIP REFER message. In order to use the SIP NOTIFY message, the server should first perform subscription to an event related to the service in advance. The server may perform the subscription through the SIP SUBSCRIBE message. Further, the message generator 240 may generate an invitation message for the service. The invitation message may be the SIP INVITE message.

The transmitter 250 may transmit a setup message generated by the message generator 240 to the terminal. The terminal may be the terminal 120 of FIG. 1. The setup message may be a notification message. The notification message may be the SIP NOTIFY message or the SIP REFER message. The terminal may receive the notification message and transmit an invitation message in response to the notification message. The invitation message may be the SIP INVITE message. The transmitter 250 may transmit a setup completion message in response to the SIP INVITE message. The setup completion message may be a "200 OK" message corresponding to the SIP INVITE message.

The transmitter 250 may transmit the invitation message generated by the message generator 240 to the terminal. The terminal may be the terminal 120 of FIG. 1. The invitation message may be the SIP INVITE message. The terminal may receive the SIP INVITE message and transmit a setup completion message in response to the SIP INVITE message. That is, the server 110 may receive the setup completion message. The setup completion message may be a "200 OK" message corresponding to the SIP INVITE message.

Figure 3:
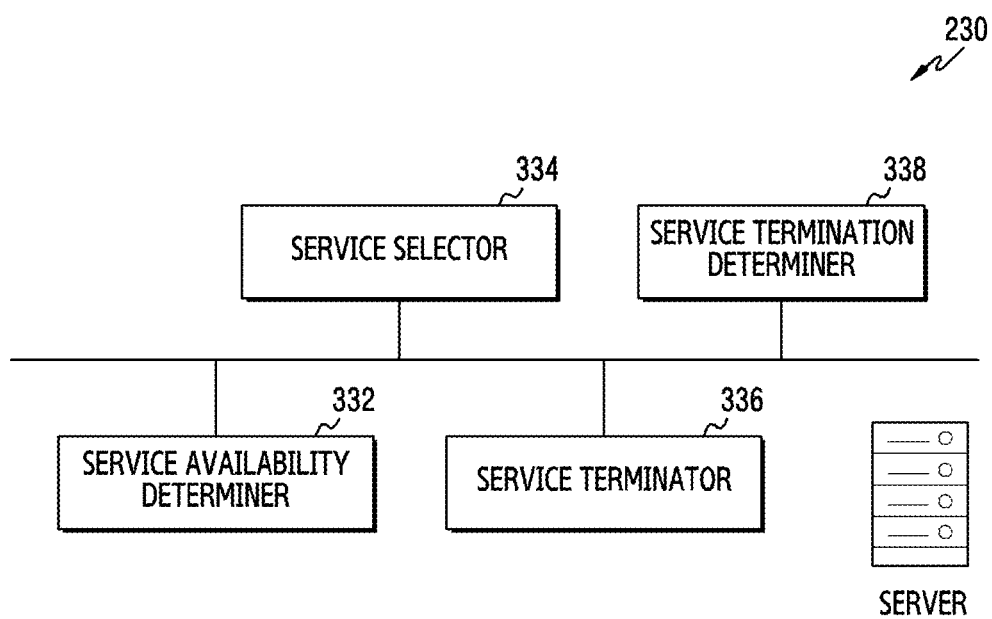
FIG. 3 is a functional block diagram of a controller of the server according to various embodiments.

FIG. 3 is a functional block diagram illustrating a controller of the server according to various embodiments. The controller may be the controller 230 of FIG. 2. Referring to FIG. 3, the controller 230 may include a service availability determiner 332, a service selector 334, a service terminator 336, and a service termination determiner 338.

Based on the number of services being provided to the terminal, the service availability determiner 332 may determine whether there is a service to be provided to the terminal. The terminal may be the terminal 120 of FIG. 1. The services being provided may be the data service 122, the call service 124, and or the second service 126 of FIG. 1. The service to be provided may be the first service 118 of FIG. 1. When the terminal can simultaneously support 3 services and the number of services being provided to the terminal is 3, the terminal has difficulty in receiving a new service. That is, the service availability determiner 332 may determine that it is difficult to provide the first service 118 to the terminal.

The service availability determiner 332 may manage the number of services which can be simultaneously supported by the terminal. The number may be determined by capability of the terminal or limit on network resources connected to the terminal. The service availability determiner 332 may manage the number of voice services which can be simultaneously supported by the terminal. That is, the service being provided and the service to be provided may be voice services. The voice service may be a group call or a private call. The service availability determiner 332 may manage the voice services individually as the group call and the private call. That is, the service availability determiner 332 may dependently manage the number of group call services, which can be simultaneously supported, and the number of private call services, which can be simultaneously supported. For example, the number of group call services connected to the terminal is 3, and the number of private call services connected to the terminal is 0. The case where the number of group call services, which can be simultaneously supported, is 3 and the number of private call services, which can be simultaneously supported, is 1 is assumed. When the server receives a request for a new group call service, the service availability determiner 332 may determine that the terminal has difficulty in receiving a new group call service. Since a category of the new service belongs to the group call, the number of private call services, which can be currently supported, may not be considered.

When the service availability determiner 332 determines that there is a service to be provided to the terminal, the message generator 240 may generate a setup message of the service to be provided and the transmitter 250 may transmit the setup message to the terminal. When the service availability determiner 332 determines that there is no service to be provided to the terminal, the service selector 334 may select one of the services being provided to the terminal and the services to be provided to the terminal and manage services which can be simultaneously supported by the terminal.

The service selector 334 may select one of the services being provided to the terminal and the services to be provided to the terminal. Information on the services being provided to the terminal may be stored in the service storage unit 220 of FIG. 2. The service selector 334 may use the information on the services being provided to the terminal stored in the service storage unit 220. The information may be information for determining a priority. The service selector 334 may select one of the services based on the priority information. The priority information may include a user membership level, user subscription information, and a type/function of the terminal. The priority information may be changed according to a situation or a time. When the services are voice services, the priority information may be a call type (a normal call or an emergency call), a media type (a voice, text, or an image), a user priority, and a priority of a member joining in a group call.

When the disaster safety situation is considered, the service selector 334 may select one of the services being provided to the terminal and the services to be provided to the terminal through the MCPTT technology. When the MCPTT technology is used, the service selector 334 may divide the services into a group call, a one-to-one call, and an emergency notification. The group call may include a normal group call that requires group communication for public safety, an emergency call that can provide communication with the top priority when an urgency/emergency situation occurs, and an emergency risk call which can perform group communication in case of an imminent urgency/emergency situation having a priority lower than the emergency call. The one-to-one call may include a normal call and an emergency call. Further, the one-to-one call may support an ambient listening function by which an ambient sound of the other party can be heard.

The service selector 334 may select a service having the lowest priority from the service having the lowest priority among the services being provided to the terminal and the services to be provided to the terminal. When the priority of the service to be provided to the terminal is low, the service selector 334 may select the service to be provided to the terminal. In this case, the server may wait until at least one of the services to be provided to the terminal is terminated. That is, the server may wait for a time point at which resources supporting a new service are generated according to a limit on the number of services simultaneously supported by the terminal.

When the priority of the service having the lowest priority among the services being provided to the terminal has a lower priority, the service selector 334 may select the service having the lowest priority among the services being provided to the terminal. The one service may be the second service 126 of FIG. 1. In this case, the service terminator 336 may terminate the one service. That is, the service terminator 336 may forcibly terminate the service having the lowest priority in order to provide the one service to the terminal in consideration of the limit on the number of services which can be simultaneously supported by the terminal.

The service termination determiner 338 may determine whether at least one of the services being provided to the terminal is terminated. That is, when resources which can be simultaneously supported by the terminal are all used, the server may have difficulty in providing the services, which are to be provided to the terminal, to the terminal. Accordingly, the server may terminate at least one of the services being provided to the terminal or may be required to wait until the termination. The service termination determiner 338 may determine whether to terminate at least one of the services being provided to the terminal for a smooth operation of the server. In order to determine whether resources of the services, which can be simultaneously supported by the terminal, are available, the service termination determiner 338 may determine whether to terminate at least one of the services being provided to the terminal.

When the service termination determiner 338 determines that at least one of the services is terminated, the message generator 240 may generate a setup message of the service to be provided in response to the termination and the transmitter 250 may transmit the setup message to the terminal.

In the description of the controller 230, the services are divided into two groups such as the services being provided to the terminal and the services to be provided to the terminal. According to various embodiments of the present disclosure, the service being provided to the terminal may include not only a service, which the server provides to the terminal, but also a service, which the terminal provides to the server. That is, the services being provided to the terminal may mean all services connected to the terminal.

Figure 4:
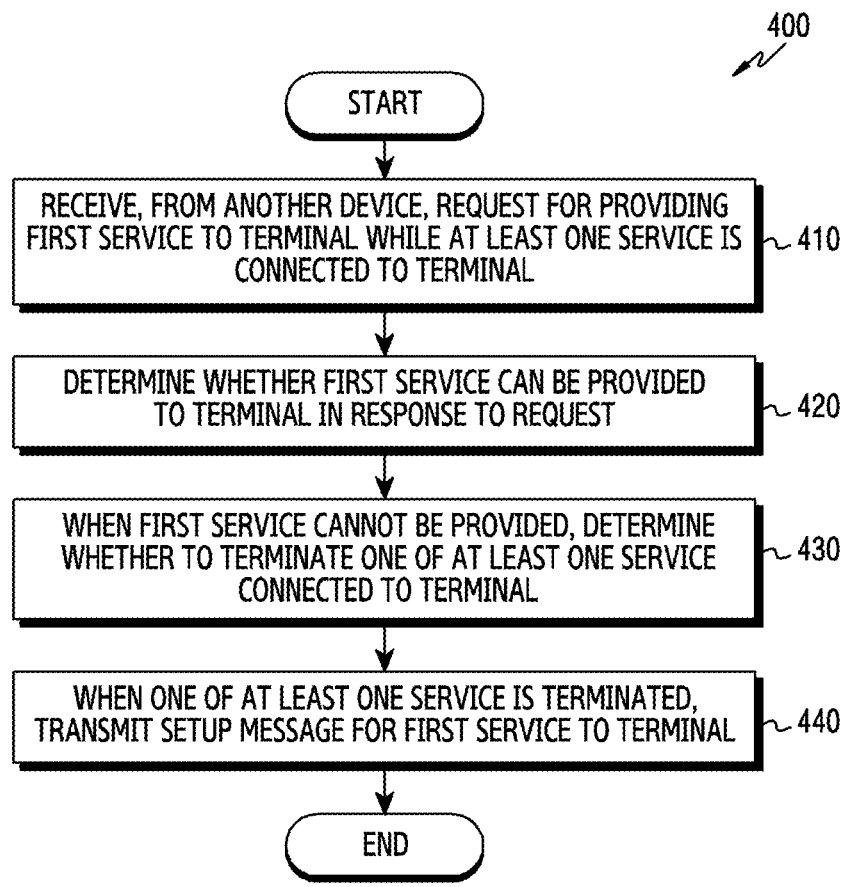
FIG. 4 is a flowchart illustrating the operation of the server according to various embodiments.

FIG. 4 is a flowchart illustrating a server according to various embodiments. The server may be the server 110 of FIG. 1.

Referring to FIG. 4, the server 110 may receive a request for providing a first service to the terminal from another device while at least one service is connected to the terminal in step 410. The other device may be another server, a terminal, or an electronic device. For example, when the first service is a voice service, another user who wants a call with a user of the terminal may transmit the request to a hosting server of the user through a hosting server of the other user. That is, the hosting server of the user may receive the request.

In step 420, the server 110 may determine whether the first service can be provided to the terminal in response to the request. A situation where the terminal can simultaneously support 3 services will be described. At this time, the server 110 may provide the first service to the terminal when fewer than 3 services are being performed in the terminal.

Since there are idle resources which can be supported by the terminal, the server 110 may connect the first service by connecting to the resources. However, when the maximum number of services, which can be supported by the terminal, are being performed, the server 110 has difficulty in additionally providing a new service to the terminal. Accordingly, the server 110 may determine that the first service cannot be provided to the terminal.

When the first service cannot be provided, the server 110 may determine whether to terminate at least one of the services connected to the terminal in step 430. The terminal may be the terminal 120 of FIG. 1. The server 110 may determine a time point at which the one service is terminated based on priorities of the one service and the first service. As described below, when the one service is selected, the server 110 may terminate the connection between the terminal 120 and the one service. However, when the first service is selected, the server 110 may wait until the connection of the one service is terminated. That is, the server 110 may wait until resources, which can be supported by the terminal 120, are generated among the resources, which can be connected to the service.

When one service of the at least one service is terminated, the server 110 may transmit a setup message for the first service to the terminal in step 440. Since the one service is terminated, the terminal 120 may have resources which can be connected to a new service. The server 110 may transmit the setup message to the terminal 120 in order to connect the first service to the connectable resources. According to various embodiments of the present disclosure, the setup message may be a notification message or an invitation message. The notification message may be an SIP NOTIFY message. The invitation message may be an SIP INVITE message.

According to various embodiments of the present disclosure, step 430 may include two cases. The operation of the server 110 may vary depending on the selection of the server 110 between the newly connected service and the conventionally connected service. Hereinafter, FIG. 5 describes a situation where the server 110 selects the conventionally connected service as a service having a low priority, and FIG. 6 illustrates a situation where the server 110 selects the newly connected service as a service having a low priority.

Figure 5:
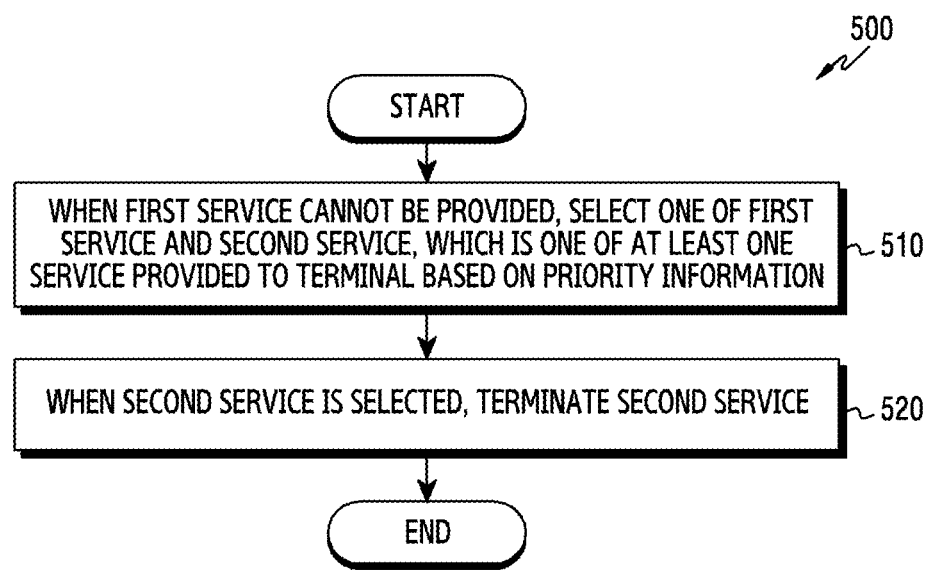
FIG. 5 is a flowchart illustrating the case where the server selects a second service according to various embodiments.
Figure 6:
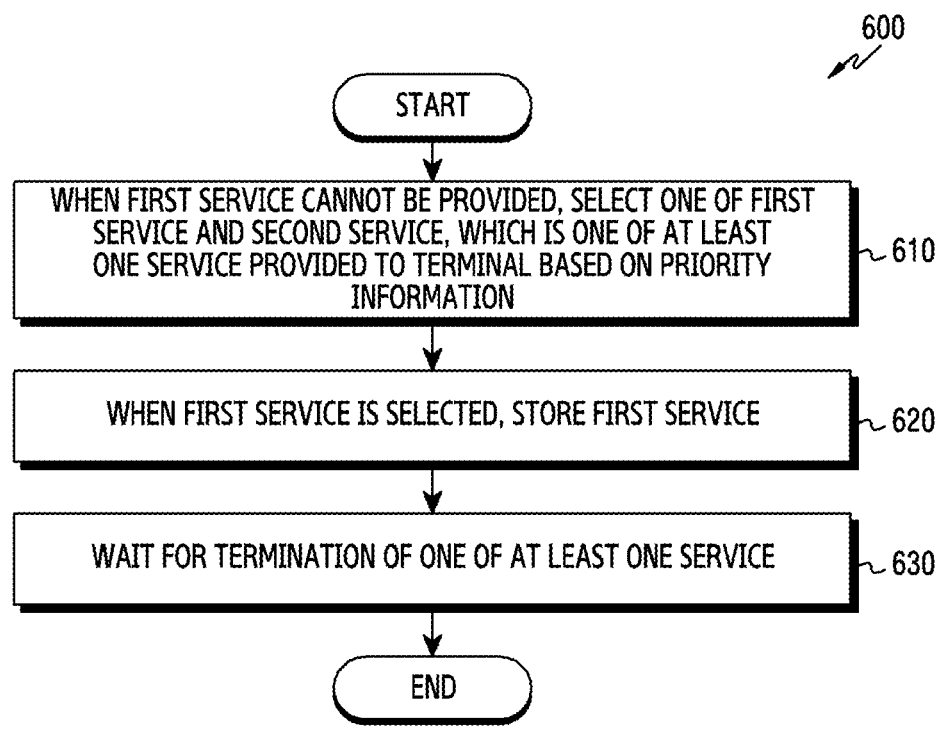
FIG. 6 is a flowchart illustrating the case where the server selects a first service according to various embodiments.

FIG. 5 is a flowchart illustrating the case where a server selects a second service according to various embodiments. The server may be the server 110 of FIG. 1.

Referring to FIG. 5, when it is determined that the server 110 determines that the first service cannot be provided to the terminal 120, the server 110 may select one of the first service and the second service based on priority information in step 510. The priority information may include a user membership level, user subscription information, and a type/function of the terminal. The priority information may be changed according to a situation or a time. For example, when the services are voice services, the priority information may be a call type (a normal call or an emergency call), a media type (a voice, text, or an image), a user priority, and a priority of a member joining in a group call. As described above, when the MCPTT service is considered, the priority may be set to be high for public safety.

In step 520, the server 110 may select the second service based on the priority information. The second service may be a service having the lowest priority among at least one service connected to the terminal 120. The server 110 may select a service having a relatively lower priority between the second service and a newly connected service. When the second service has a lower priority than the first service, the server 110 may terminate the second service. As the second service is terminated, the server 110 may provide the first service having a relatively high priority to the terminal 120. For example, when the number of services, which can be simultaneously supported by the terminal 120 is 3 and the 3 resources are all used, the number of available resources is 0 and changes into 1 as the second service is terminated. In another embodiment, when the first service is the MCPTT service, the server 110 may terminate the other service (for example, the second service) while making the MCPTT service a top priority for public safety.

FIG. 6 is a flowchart illustrating the case where a server selects a first service according to various embodiments. The server may be the server 110 of FIG. 1.

Referring to FIG. 6, when the server 110 determines that the first service cannot be provided to the terminal 120, the server 110 may select one of the first service and the second service based on priority information in step 610. The priority information may be the same as the priority information of FIG. 5.

In step 620, the server 110 may select the first service between the first service and the second service based on the priority information. The second service may be a service having the lowest priority among at least one service connected to the terminal 120. The server 110 may select a service having a relatively lower priority between the second service and a newly connected service. For example, when the first service has a lower priority than the second service, the server 110 may store the first service in a memory. In another example, the server 110 may stand by rather than directly providing the first service to the terminal 120. When the server 110 determines that there is no resource which can be newly connected to the terminal 120 and there is no service, which is required to be terminated because of its low priority, among the services connected to the terminal 120, the server 110 may determine that it is difficult to connect the first service to the terminal 120 in its current state. The server 110 may store the first service in the memory in order to leave an interval in provision of the first service. The memory may be a term that collectively refers to storage media.

In step 630, the server 110 may wait for a time point at which the service being provided to the terminal is terminated. The server 110 does not have to wait for a time point at which the second service having the lowest priority is terminated. Time points at which respective services are terminated may be different regardless of their priorities. The server 110 may continuously receive information on the services being provided to the terminal 120 from the hosting server that manages the terminal 120. Alternatively, the server 110 may directly manage information the services being provided to the terminal 120. When at least one of the services being provided to the terminal 120 is terminated, the server 110 may recognize a time point at which the service is terminated based on the information. After the time point, the server 110 may load information on the first service from the memory. Alternatively, the server 110 may have the information on the first service ready in a buffer. Based on the information on the first service, the server 110 may provide the first service to the terminal 120.

Figure 7:
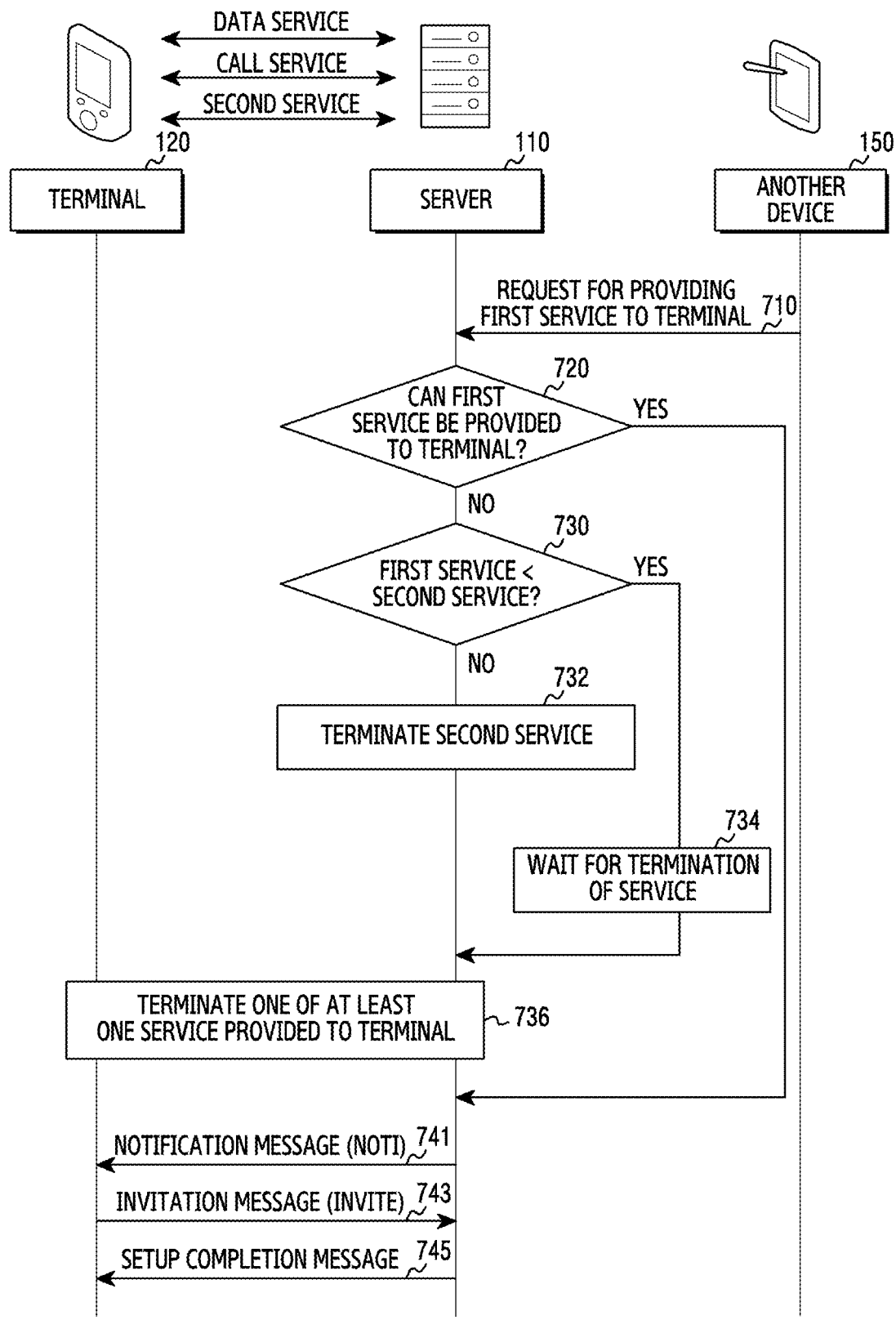
FIG. 7 illustrates a server-oriented network environment according to various embodiments.

FIG. 7 illustrates a server-oriented network environment according to various embodiments.

Referring to FIG. 7, another device 150 may transmit a request to the server 110 in step 710. The request may be a request for providing the first service to the terminal 120.

In step 720, the server 110 may determine whether the terminal 120 can currently receive the first service, that is, whether the terminal 120 can be connected to the first service. When the number of services which can be simultaneously supported by the terminal 120 is smaller than the number of services being performed by the terminal 120, the server 110 may transmit the setup message for the first service to the terminal 120 in order to configure a session. A detailed description of the setup message will be made below. When the number of services which can be simultaneously supported by the terminal 120 is the same as the number of services being performed by the terminal 120 in step 720, the server 110 may be required to perform selection in connection with the service to be terminated.

In step 730, the server 110 may select the service having a lower priority between the second service having the lowest priority among the services being provided to the terminal 120 and the first service to be newly provided to the terminal 120. When the server 110 selects the second service, the server 110 may terminate the selected second server in step 732. When the server 110 selects the first service, the server 110 may wait for termination of at least one of the services connected to the terminal 120 in step 734.

In step 736, the server 110 may determine whether at least one of the services provided to the terminal 120 is terminated. The server 110 may perform step 736 without separation from other steps as necessary. For example, when the second service is forcibly terminated in step 732, the server 110 may directly recognize that one of at least one service provided to the terminal 120 is terminated. When step 734 is performed, step 736 may have a meaning as a step of grasping a termination time point.

When the server 110 determines that the first service can be provided to the terminal 120 through the steps, the server 110 may transmit a setup message to the terminal 120 in order to configure a session for providing the first service in step 741. According to various embodiments of the present disclosure, the setup message may be a notification message. When an SIP protocol is considered, the notification message may be an SIP REFER or SIP NOTIFY message. When the server 110 uses the SIP NOTIFY message, the server 110 should first perform subscription to a particular event for the terminal 120 through an SIP SUBSCRIBE message. The event may be related to provision of the first service.

In step 743, the terminal 120 may transmit an invitation message to the server 110 in response to the notification message. When the SIP protocol is considered, the invitation message may be an SIP INVITE message.

In step 745, the server 110 may transmit a setup completion message indicating that the setup has been completed to the terminal 120 in response to the invitation message. When the received invitation message is the SIP INVITE message, the server 110 may transmit a "200 OK" message indicating that the setup of the session has been completed to the terminal 120 in response to the invitation message. Through the above-described operations, the session for the first service may be established between the server 110 and the terminal 120.

Figure 8:
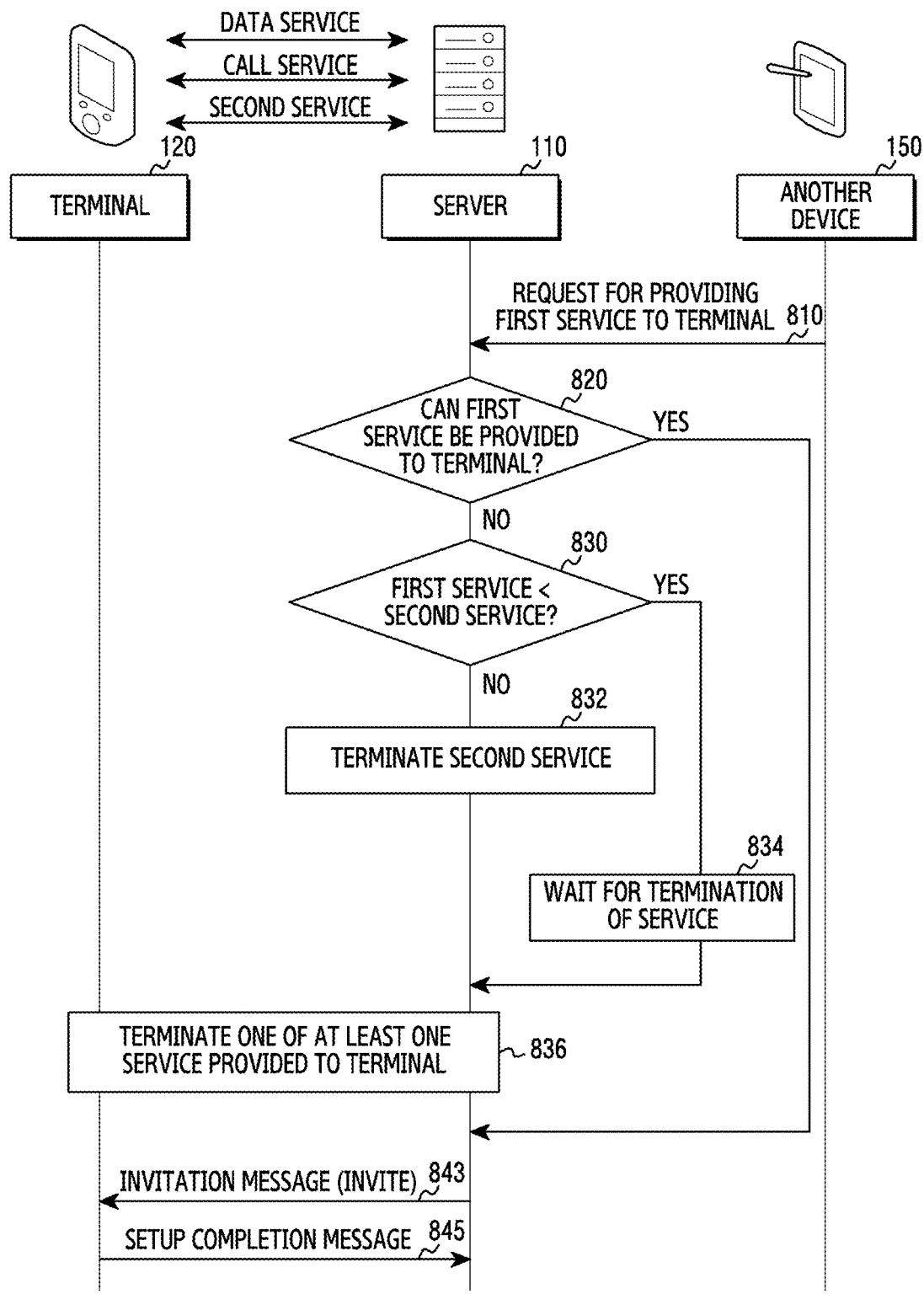
FIG. 8 illustrates an example of another server-oriented network environment according to various embodiments.

FIG. 8 illustrates an example of another server-oriented network environment according to various embodiments. Some operations of the embodiment illustrated in FIG. 8 may correspond to those illustrated in FIG. 7.

Referring to FIG. 8, another device 150 may transmit a request to the server 110 in step 810. The request may be a request for providing the first service to the terminal 120. This may correspond to step 710 of FIG. 7.

In step 820, the server 110 may determine whether the terminal 120 can currently receive the first service, that is, the terminal 120 can be connected to the first service. Step 820 may correspond to step 720 of FIG. 2.

In step 830, the server 110 may select a service having a lower priority between the second service having the lowest priority among the services provided to the terminal 120 and the first service to be newly provided to the terminal 120. Step 830 may correspond to step 730 of FIG. 7. When the server 110 selects the second service, the server 110 may terminate the selected second service in step 832. When the server 110 selects the first service, the server 110 may wait for termination of at least one of the services connected to the terminal 120 in step 834. Step 832 may correspond to step 732 of FIG. 7, and step 834 may correspond to step 734 of FIG. 7.

In step 836, the server 110 may determine whether at least one of the services provided to the terminal 120 is terminated. The server 110 may perform step 836 without separation from other steps as necessary. Step 836 may correspond to step 736 of FIG. 7.

When the server 110 determines that the first service can be provided to the terminal 120 through the steps, the server 110 may transmit a setup message for configuring a session with the first service to the terminal 120 in step 843. According to various embodiments of the present disclosure, the setup message may be an invitation message. When the SIP protocol is considered, the invitation message may be an SIP INVITE message. In step 845, the terminal 120 may transmit a setup completion message indicating that the setup has been completed to the server 110 in response to the invitation message. When the transmitted invitation message is the SIP INVITE message, the server 110 may receive a "200 OK" message indicating that the setup of the session has been completed from the terminal 120 in response to the invitation message. Finally, the session for the first service is generated between the server 110 and the terminal 120.

The system is constructed such that the server 110 transmits the notification message to the terminal 120 and the terminal 120 directly transmits the invitation message for configuring the session in the embodiment of FIG. 7, but the system is constructed such that the server 110 directly transmits the invitation message to the terminal 120 in FIG. 8.

FIG. 2 to FIG. 8 are described based on the operation of the server according to various embodiments of the present disclosure. The operation of managing the services connected to the terminal and the operation of selecting the service from the connected services and the services to be connected may be performed by the terminal as well as the server. However, the server may manage services currently being performed by all terminals (users) supported by the server when the server manages corresponding information, but the terminal may manage only the services being performed, which are related to the terminal when the terminal manages the corresponding information. Hereinafter, FIG. 9 to FIG. 14 will be described based on the operation of the terminal according to various embodiments of the present disclosure. Although the relation between the terminal and the server and the relation between the server and another server are described in this document, a direct wired connection or a direct wireless connection between respective elements (terminal or server) as well as a connection through an eNB may be included.

Figure 9:
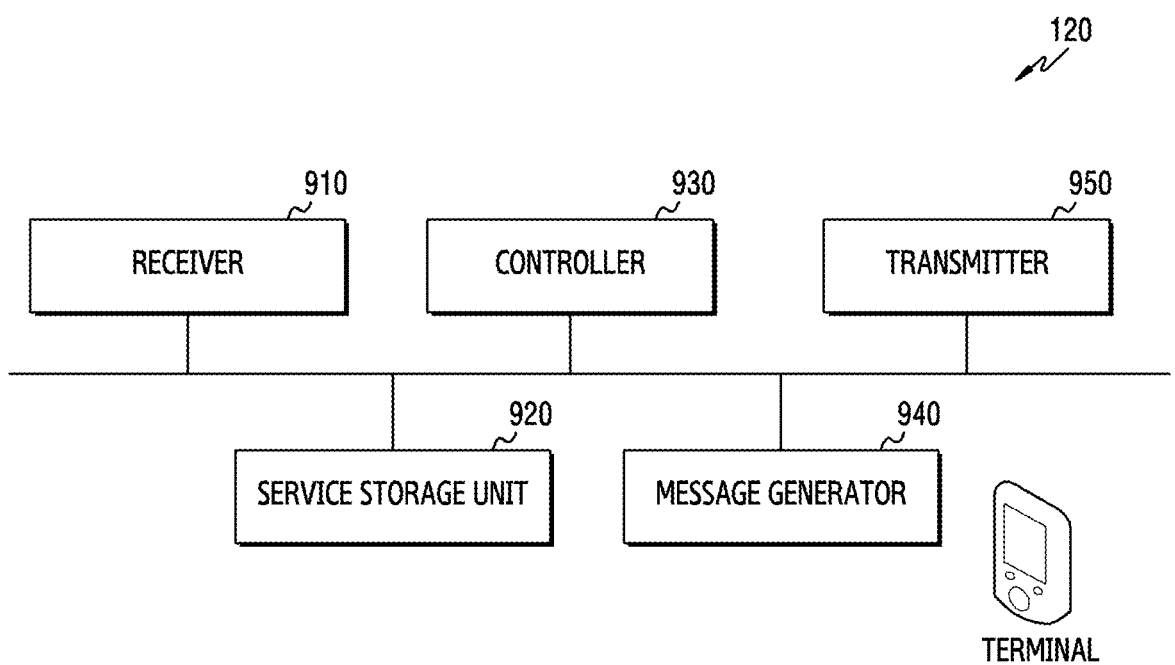
FIG. 9 is a functional block diagram of a terminal according to various embodiments.

FIG. 9 is a functional block diagram of a terminal according to various embodiments. According to the type of network, the widely known terms such as "base station" or "Access Point (AP)" may be used instead of the term "eNB" (or "eNodeB). For convenience, the term "eNB" (or "eNodeB") may be used for referring to network infrastructure elements that provide radio access to remote terminals in this patent document. Further, according to the type of network, the widely known terms such as "mobile station", "subscriber station", "remote terminal", "wireless terminal", or "user device" may be used instead of the term "terminal (or User Equipment (UE))".

Referring to FIG. 9, the terminal 120 may include a receiver 910, a service storage unit 920, a controller 930, a message generator 940, and a transmitter 950. As described above, when the disaster safety situation is considered, the terminal 120 may be a terminal that supports MCPTT in a disaster safety network system.

The receiver 910 performs functions for transmitting/receiving a signal through a wireless channel. The receiver 910 may receive a setup message for providing a first service from the server. The setup message may be a notification message. The notification message may be an SIP NOTIFY message in an SIP protocol. This is the same protocol as the SIP NOTIFY in FIG. 2. The receiver 910 may transmit the message to the service storage unit 920 or the controller 930.

The service storage unit 920 may be a non-volatile memory including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), other types of optical storage devices, or a magnetic cassette. Alternatively, the service storage unit 920 may be a memory configured by a combination of some or all of them.

The service storage unit 920 may store information on the first service from the receiver 910. The service storage unit 920 may store information on a plurality of services provided from the server as well as the first service. When the controller 930 makes a request for information on a particular service, the service storage unit 920 may transmit the information to the controller 930.

The controller 930 may determine whether there is a service to be received from the server based on the number of services provided from the server. The controller 930 may manage the number of services, which can be simultaneously supported, provided from the server. The controller 930 may select one of the services provided from the server and the services to be provided from the server. The controller 930 may select a service having the lowest priority from a service having the lowest priority among the services provided from the server and the services to be provided from the server. When the service to be provided from the server is selected among the services, the controller 930 may terminate the service provided from the server. The controller 930 may determine whether at least one of the services provided from the server is terminated.

The message generator 940 may generate a message to be transmitted to the server according to the operation of the controller 930. The message generator 940 may generate an SIP message. The SIP is the same as the SIP described in FIG. 2. The type of the SIP message used by the terminal 120 is the same as that shown in [Table 1] above. When the controller 930 determines termination, the message generator 940 may generate a new message in response to the termination. The new message may correspond to the service newly provided to the terminal 120. The service may be the first service 118 of FIG. 1. The message generator 940 may generate an invitation message for the service. The invitation message may be the SIP INVITE message.

The transmitter 950 may transmit the setup message generated by the message generator 940 to the server. The server may be the server 110 of FIG. 1. The setup message may be an invitation message. The invitation message may be the SIP INVITE message. The terminal 120 may receive a setup completion message in response to the SIP INVITE message. The setup completion message may be a "200 OK" message corresponding to the SIP INVITE message.

Figure 10:
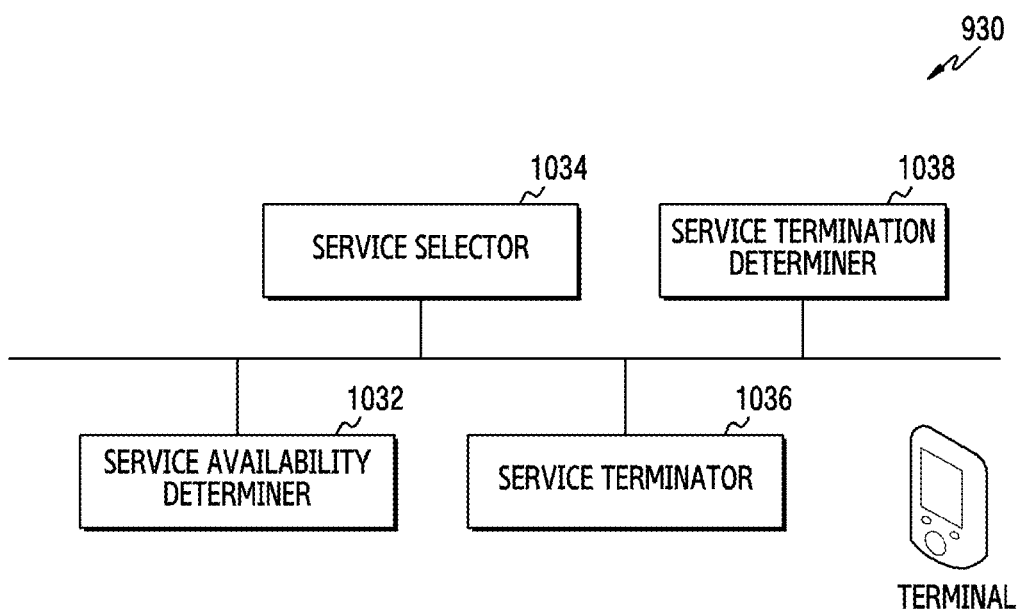
FIG. 10 is a functional block diagram of a controller of the terminal according to various embodiments.

FIG. 10 is a functional block diagram of a controller of the terminal according to various embodiments. The controller may be the controller 930 of FIG. 9. Referring to FIG. 10, the controller 930 may include a service availability determiner 1032, a service selector 1034, a service terminator 1036, and a service termination determiner 1038.

The service availability determiner 1032 may determine whether there is a service to be provided from the server based on the number of services provided from the server. The server may be the server 110 of FIG. 1. The service provided to the terminal may be the data service 122, the call service 124, or the second service 126. The service to be provided may be the first service 118 of FIG. 1. When the terminal can simultaneously support 3 services and the number of services provided to the terminal is 3, the terminal has difficulty in receiving a new service. That is, the service availability determiner 1032 may determine that it is difficult to receive the first service 118 from the server 110.

The service availability determiner 1032 may manage the number of services, which can be simultaneously supported, provided from the server. The number may be determined by a capability of the terminal or a limit on network resources connected to the terminal. The service availability determiner 1032 may manage the number of voice services, which can be simultaneously supported, provided from the server. That is, the provided service and the service to be provided may be voice services. The voice service may be a group call or a private call. The service availability determiner 1032 may manage the voice services individually as the group call and the private call. That is, the service availability determiner 1032 may dependently manage the number of group call services, which can be simultaneously supported, and the number of private call services, which can be simultaneously supported. For example, the number of group call services connected to the terminal is 3, and the number of private call services connected to the terminal is 0. The case where the number of group call services, which can be simultaneously supported, is 3 and the number of private call services, which can be simultaneously supported, is 1 is assumed. When the terminal receives a request for a new group call service, the service availability determiner 1032 may determine that the terminal has difficulty in receiving a new group service. Since a category of the new service belongs to the group call, the number of private call services, which can be currently supported, may not be considered.

When the service availability determiner 1032 determines that there is a service to be provided from the server, the message generator 940 may generate a setup message of the service to be provided and the transmitter 950 may transmit the setup message to the terminal. When the service availability determiner 1032 determines that there is no service to be provided from the server, the service selector 1034 may select one of the services provided from the server and the services to be provided from the server and manage services, which can be simultaneously supported.

The service selector 1034 may select one of the services provided from the server and the services to be provided from the server. Information on the services to be provided from the server may be stored in the service storage unit 920 of FIG. 9. The service selector 1034 may use the information on the services provided from the server stored in the service storage unit 920. The information may be information for determining a priority. The service selector 1034 may select one of the services based on the priority information. The priority information may include a user membership level, user subscription information, and a type/function of the terminal. The priority information may be changed according to a situation or a time. When the services are voice services, the priority information may be a call type (a normal call or an emergency call), a media type (a voice, text, or an image), a user priority, and a priority of a member joining in a group call.

When the disaster safety situation is considered, the service selector 1034 may select one of the services being provided to the terminal and the services to be provided to the terminal through the MCPTT technology. The MCPTT technology is the same as the MCPTT technology of FIG. 3.

The service selector 1034 may select a service having a lower priority between the service having the lowest priority among the services provided from the server and the service to be provided from the server. When the service to be provided from the server has a lower priority, the service selector 1034 may select the service to be provided from the server. In this case, the terminal may wait until at least one of the services provided from the server is terminated. That is, the terminal may wait for a time point at which resources which can support a new service are generated according to the limit on the number of services which can be simultaneously supported.

When the service having the lowest priority among the services provided from the server has a lower priority than the service to be provided from the server, the service selector 1034 may select the service having the lowest priority among the services provided from the server. The one service may be the second service 126 of FIG. 1. In this case, the service terminator 1036 may terminate the one service. That is, in consideration of the number of services, which can be simultaneously supported, the service terminator 1036 may forcibly terminate the service having the lowest priority in order to allow the terminal to receive the one service.

The service termination determiner 1038 may determine whether at least one of the services provided from the server is terminated. That is, when resources of the services, which can be simultaneously supported by the terminal, are all used, it is difficult to additionally receive a service from the server.

Accordingly, the terminal may be required to terminate at least one of the services provided from the server or to wait until at least one service is terminated. The service termination determiner 1038 may determine whether to terminate at least one of the services, which the terminal receives, for the smooth operation. In order to determine whether resources of the services, which can be simultaneously supported by the terminal, can be used, the service termination determiner 1038 may determine whether to terminate at least one of the services provided to the terminal.

When the service termination determiner 1038 determines that at least one service is terminated, the message generator 940 may generate an invitation message of the service to be provided in response to the termination and the transmitter 950 may transmit the invitation message to the server.

In the description of the controller 930, the services are divided into two groups including the service provided from the server and the service to be provided from the server. According to various embodiments of the present disclosure, the services provided from the server may include services, which the server receives from the terminal, as well as the services, which the terminal receives from the server. In other words, the services provided from the server may mean all services connected to the terminal.

Figure 11:
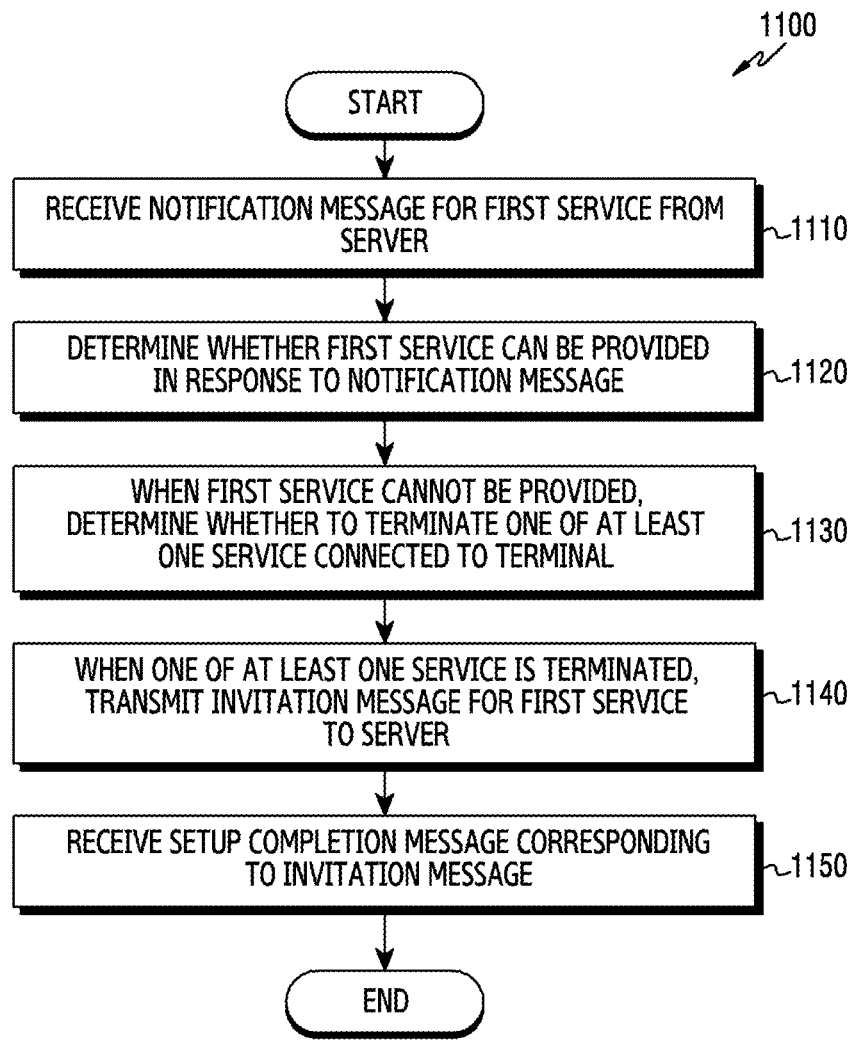
FIG. 11 is a flowchart illustrating the operation of the terminal according to various embodiments.

FIG. 11 is a flowchart illustrating the operation of the terminal according to various embodiments. The terminal may be the terminal 120 of FIG. 1. The terminal 120 may receive a service from the server 110.

Referring to FIG. 11, in step 1110, the terminal 120 may receive a notification message for a first service from the server 110. The first service may be a service provided by a request from another device. The other device may be a server, a terminal, or an electronic device. For example, when the first service is a voice service, another user who wants a call with a user of the terminal 120 may transmit a request to a hosting server of the user through a hosting server of the other user and transmit the notification message for the first service to the terminal. The notification message may be an SIP NOTIFY message.

In step 1120, the terminal 120 may determine whether the first service can be provided from the server 110 in response to the notification message. Hereinafter, a situation where the terminal can simultaneously support 3 services will be assumed as an example. When the terminal 120 performs fewer than 3 services, the server 110 may provide the first service to the terminal 120. Since there are still resources which can be supported by the terminal 120, the server 110 may connect the first service by connecting to the resources. However, when the terminal 120 performs 3 services, the terminal 120 has difficulty in receiving a new service. Accordingly, the terminal 120 may determine that the terminal 120 cannot receive the first service from the server 110.

When the terminal 120 cannot receive the first service, the terminal 120 may determine whether to terminate one of at least one service connected to the server 110 in step 1130. The terminal 120 may determine a time point at which the one service is terminated according to priorities of the one service and the first service. As described below, when the one service is selected, the terminal 120 may terminate the connection of the one service. However, when the first service is selected, the terminal 120 may wait until the connection of the one service is terminated. That is, the terminal may wait until available resources among the resources, which can be connected to the service, are generated.

When one of the at least one service is terminated, the terminal 120 may transmit an invitation message for the first service to the server 110 in step 1140. Since the one service is terminated, the terminal 120 may have resources which can be connected to a new service. In order to connect the first service to the resources, which can be connected, the terminal 120 may transmit the invitation message for configuring a session. The invitation message may be an SIP INVITE message.

In step 1150, the terminal 120 may receive a setup completion message corresponding to the invitation message from the server 110. The setup completion message may mean that the setup of the session between the terminal 120 and the server 110 has been completed. When the invitation message is an SIP INVITE message, the setup completion message may be a "200 OK" message.

According to various embodiments of the present disclosure, step 1130 may include two cases. The operation of the terminal 120 may vary depending on the selection of the terminal 120 between the newly connected service and the conventionally connected service. Hereinafter, FIG. 12 illustrates a situation where the server 110 selects the conventionally connected service as a service having a low priority, and FIG. 13 illustrates a situation where the server 110 selects the newly connected service as a service having a low priority.

Figure 12:
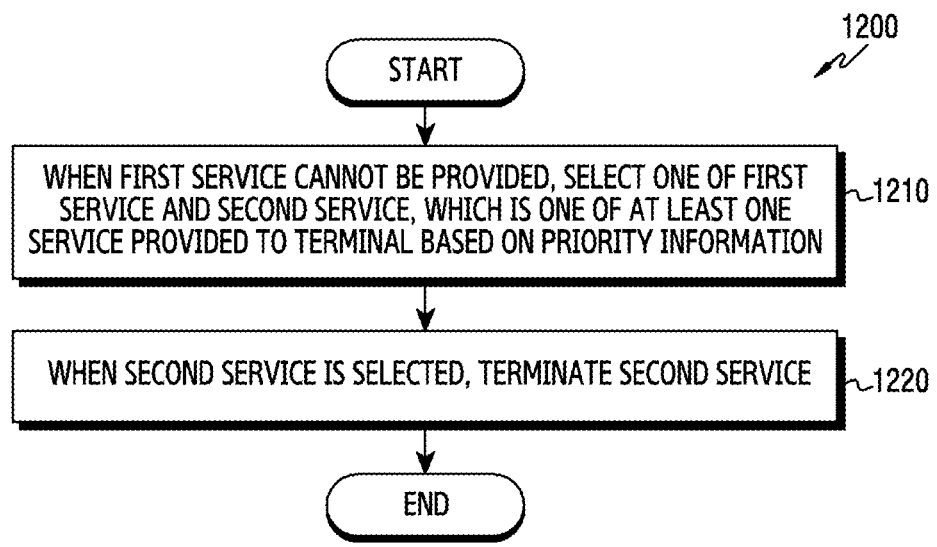
FIG. 12 is a flowchart illustrating the operation when the terminal selects a second service according to various embodiments.
Figure 13:
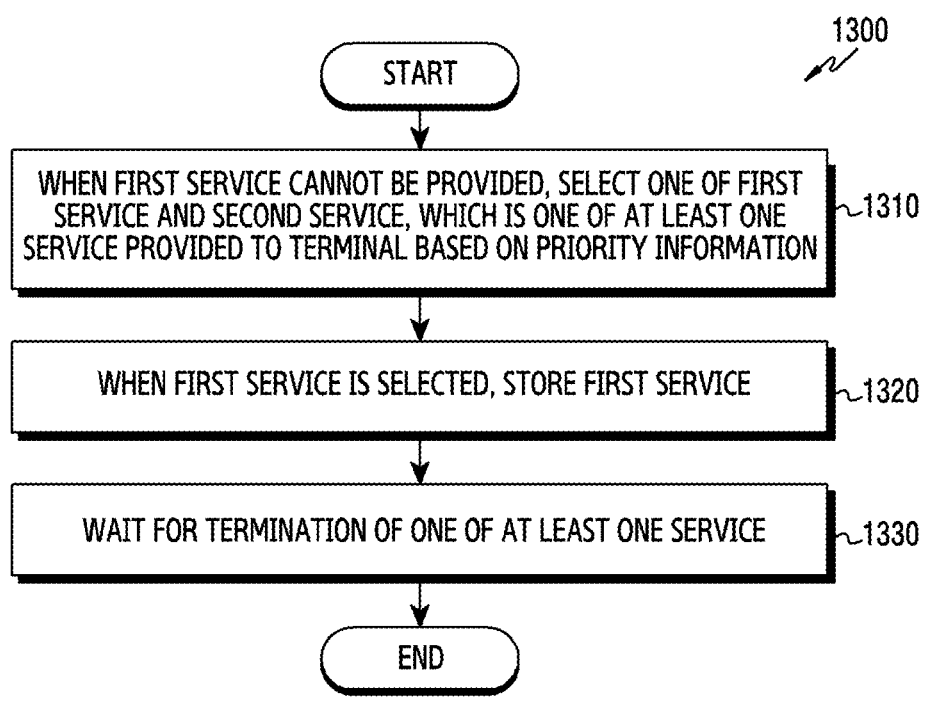
FIG. 13 is a flowchart illustrating the operation when the terminal selects a first service according to various embodiments.

FIG. 12 is a flowchart illustrating the operation when the terminal selects a second service according to various embodiments. The terminal may be the terminal 120 of FIG. 1.

Referring to FIG. 12, when it is determined that the terminal 120 cannot receive a first service from the server 110, the terminal 120 may select one of the first service and the second service based on priority information in step 1210. The priority information may include a user membership level, user subscription information, and a type/function of the terminal. The priority information may be changed according to a situation or a time. When the services are voice services, the priority information may be a call type (a normal call or an emergency call), a media type (a voice, text, or an image), a user priority, and a priority of a member joining in a group call. As described above, when the MCPTT service is considered, the priority may be set to be high for public safety.

In step 1220, the terminal 120 may select the second service based on the priority information. The second service may be a service having the lowest priority among at least one service connected to the server 110. The terminal 120 may select a service having a relatively lower priority between the second service and a newly connected service. When the second service has a lower priority than the first service, the terminal 120 may terminate the second service.

As the second service is terminated, the terminal 120 may receive the first service having a relatively higher priority from the server 110. For example, when the number of services, which can be simultaneously supported by the terminal 120, is 3, all of the 3 resources are used and thus there are no more resources, which can be used. Then, as the second service is terminated, the number of resources being used is 2 and thus the number of available resources is 1. Further, when the MCPTT service is considered, the terminal 120 may terminate another service since the MCPTT service has the top priority for public safety.

FIG. 13 is a flowchart illustrating the operation when the terminal selects a first service according to various embodiments. The terminal may be the terminal 120 of FIG. 1.

Referring to FIG. 13, when it is determined that the terminal 120 cannot receive the first service from the server 110, the terminal 120 may select one of the first service and the second service based on priority information in step 1310. The priority information may be the same as that of FIG. 12.

In step 1320, the terminal 120 may select the first service between the first service and the second service based on the priority information. The second service may be a service having a low priority among at least one service connected to the terminal. The terminal 120 may select a service having a relatively lower priority between the second service and a newly connected service. The terminal 120 may select a service having a relatively lower priority. When the first service has a lower priority than the second service, the terminal 120 may store the first service in a memory. Alternatively, the terminal 120 may stand by rather than immediately receiving the first service from the server 110. When it is determined that the terminal 120 has no resources, which can be newly connected to the server 110, and there is no service, which is required to be terminated because of its low priority among the services connected to the server 110, the terminal 120 has difficulty in connecting the first service to the server 110 in its current state, so that the terminal 120 may store the first service in the memory to leave a temporal interval in reception of the first service. The memory may be a term that collectively refers to storage media.

In step 1330, the terminal 120 may wait for a time point at which at least one of the services provided to the terminal 120 is terminated. The terminal 120 does not have to wait for a time point at which the second service having the lowest priority is terminated. Time points at which respective services are terminated may be different regardless of their priorities. When at least one of the services provided to the terminal 120 is terminated, the terminal 120 may recognize a time point at which the service is terminated. After the time point, the terminal 120 may load information on the first service from the memory. Alternatively, the terminal 120 may have the information on the first service ready in a buffer according to a predetermined cycle. Based on the information on the first service, the terminal 120 may receive the first service from the server 110. As described above, when currently performed service information is managed by the terminal, it may be more effective in comparison with the case where the service information is managed by the server in terms of an amount of managed information.

Figure 14:
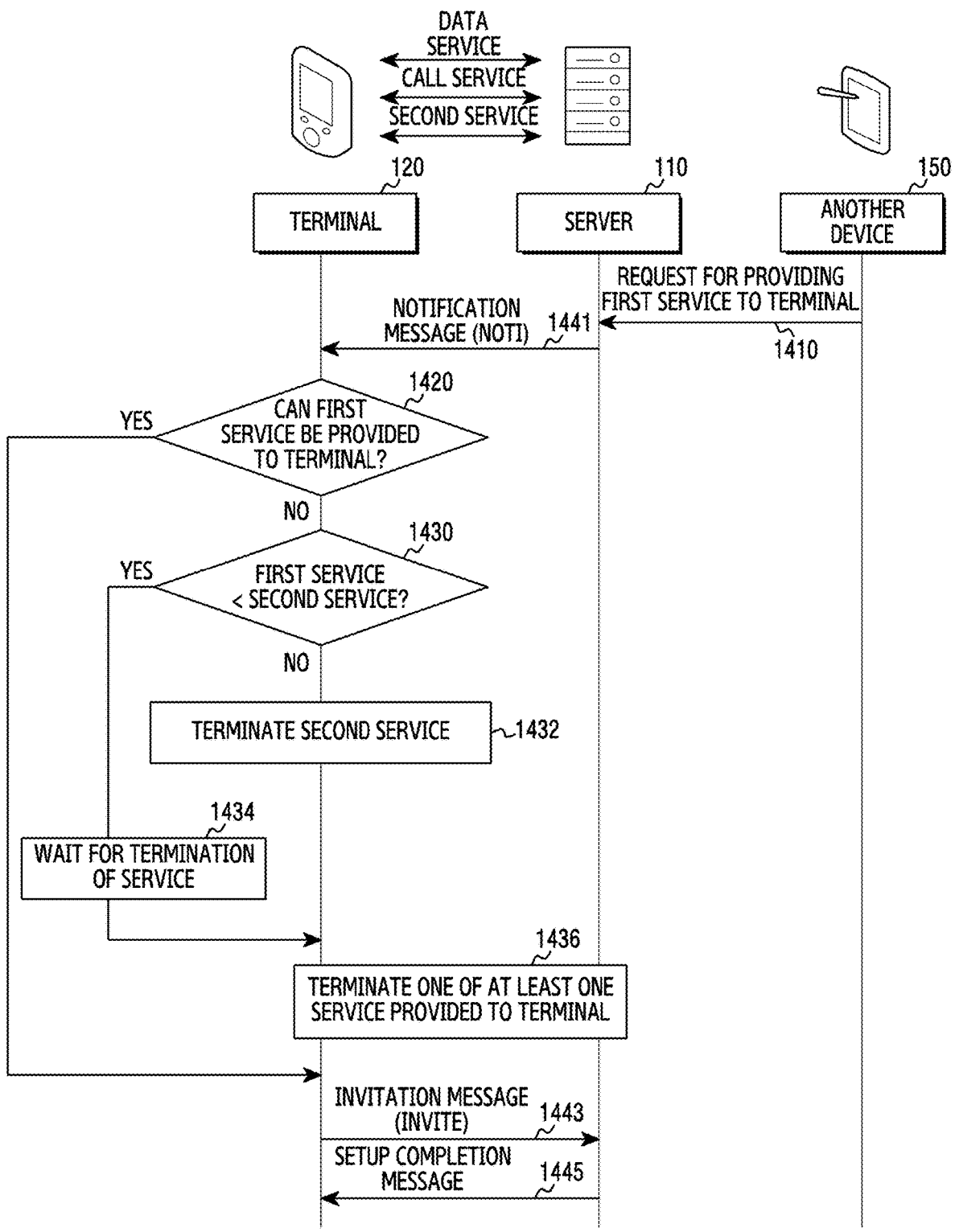
FIG. 14 illustrates a terminal-oriented network environment according to various embodiments.

FIG. 14 illustrates a terminal-oriented network environment according to various embodiments.

Referring to FIG. 14, the other device 150 may transmit a request to the server 110 in step 1410. The request may be a request for providing the first service to the terminal 120.

In step 1441, the server 110 may transmit a notification message to the terminal 120. The notification message may be SIP NOTIFY when an SIP is used. The notification message may include information on the first service. The server 110 may notify of the request for the first service from the other device 150 to the terminal 120 through the notification message.

In step 1420, the terminal 120 may determine whether the first service can be currently provided from the server 110, that is, whether the terminal 120 can be connected to the first service. When the number of services performed by the terminal 120 is smaller than the number of services, which can be simultaneously supported by the terminal 120, the terminal 120 may transmit an invitation message to the server 110. A detailed description of the invitation message will be made below. When the number of services performed by the terminal 120 is the same as the number of services, which can be simultaneously supported by the terminal 120 in step 1420, the terminal 120 may be required to perform selection in connection with a service to be terminated.

In step 1430, the terminal 120 may select a service having a lower priority between the second service having the lowest priority among the services provided from the server 110 and the first service newly provided from the server 110. When the terminal 120 selects the second service, the terminal 120 may terminate the selected second service in step 1432. When the terminal 120 selects the first service, the terminal 120 may wait for termination of at least one of the services connected to the server 110 in step 1434.

In step 1436, the terminal 120 may determine whether one of at least one service provided from the server 110 is terminated. The terminal 120 may perform step 1436 without separation from other steps as necessary. For example, when the second service is forcibly terminated in step 1432, the terminal 120 may immediately recognize that one of at least one service provided from the server 110 is terminated.

When step 1434 is performed, step 1436 may mean a step of grasping a termination time point.

When the terminal 120 determines that the first service can be provided from the server 110 through the steps, the terminal 120 may transmit an invitation message to the server 110 in order to configure a session for providing the first service in step 1443. The invitation message may be the SIP INVITE message. In step 1445, the server 110 may transmit a setup completion message indicating that the setup has been completed to the terminal 120 in response to the invitation message. When the received invitation message is the SIP INVITE message, the server 110 may transmit a "200 OK" message indicating that the setup of the session has been completed to the terminal 120 in response to the invitation message. Through the above-described operations, the session for the first service may be established between the server 110 and the terminal 120.

Figure 15:
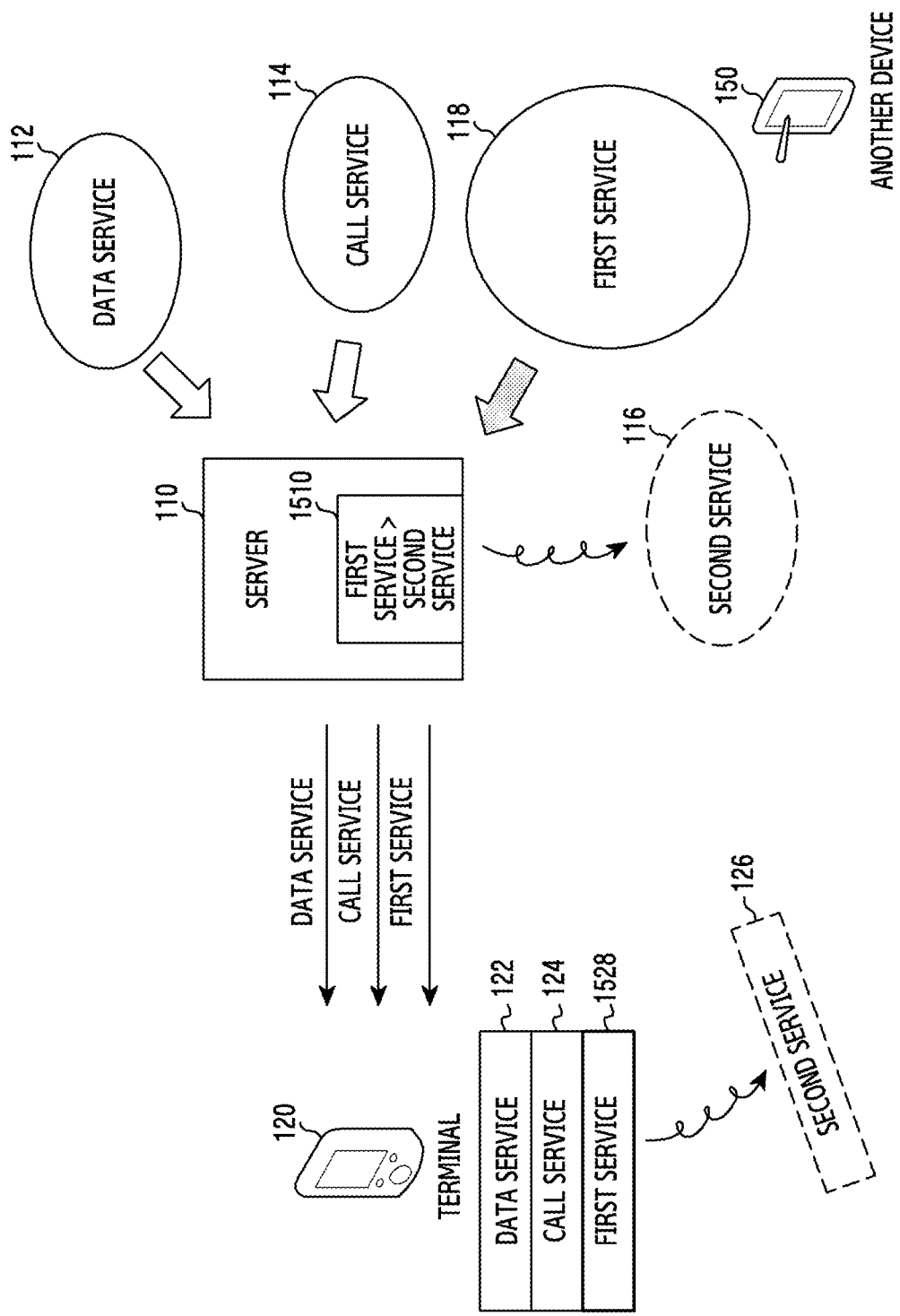
FIG. 15 illustrates the relation between the terminal and the server that support a multi-service according to various embodiments.

FIG. 15 illustrates the relation between a terminal and a server that support a multi-service according to various embodiments. The terminal or the server that supports the multi-service may mean that a plurality of services are simultaneously supported and connected to each other through the terminal or the server. The terminal may be the terminal 120 of FIG. 1, and the server may be the server 110 of FIG. 1.

Referring to FIG. 15, the server 110 may receive a request from another device 150. The request may be a request for providing a first service 118 to the terminal 120. The terminal 120 may be a terminal which supports a multi-service. The terminal 120 may simultaneously receive 3 services from the server 110. Since the terminal 120 currently receives 3 services, the terminal 120 may have difficulty in receiving more services while maintaining the current services. When a request for providing a new service is transmitted from the other device 150 to the server 110, the server 110 may be connected to a total of 4 services. In order to receive the first service 118, the server 110 or the terminal 120 may be required to wait for termination of at least one of the 3 current services or to terminate at least one service.

Hereinafter, a data service 112, a call service 114, a second service 116, and a first service 118 will be described in view of the server 110, and a data service 122, a call service 124, and a second service 126, and a first service 118 will be described in view of the terminal 120. However, it is only a difference in the entity performing determination and processing, and different reference numerals do not directly indicate different services. That is, the second service 116 and the second service 126 may be the same service.

According to various embodiments of the present disclosure, when the first service 118 has a higher priority than the second service 116, the server 110 may terminate the second service 116. According to various embodiments of the present disclosure, the terminal 120 may terminate the second service 116. When the second service 116 is terminated, the connection between the terminal 120 and the second service may be terminated. That is, the second service 126 may be terminated in the terminal 120. Thereafter, the server 110 may provide the first service 118 to the terminal 120. As the second service 126 is terminated in the terminal 120, resources of a service, which can be supported, may be generated and a first service 1528 may be connected to the resources.

According to various embodiments of the present disclosure, when the first service 118 has a lower priority than the second service 116, the server 110 may wait for termination of at least one of the data service 112, the call service 114, and the second service 116. Since the data service 112, the call service 114, and the second service 116 have a higher priority than the first service 118, a setup message for the connection of the first service 118 cannot be transmitted during the operation of the services. When the second service 116 is completely provided and then terminated, the server 110 may provide the first service 118 to the terminal 120. According to other embodiments of the present disclosure, the terminal 120 may transmit an invitation message for the first service 118 to the server 110 through the pre-received notification message.

FIG. 15 illustrates that only the second service 116 among the services provided to the terminal 120 is considered, but is not limited thereto. That is, when another service other than the second service 116 is first terminated, the server 110 may also provide the first service 118 to the terminal 120. That is, the server 110 or the terminal 120 may determine whether a service can be provided based on whether resources of the available service can be used rather than the type of service.

Figure 16:
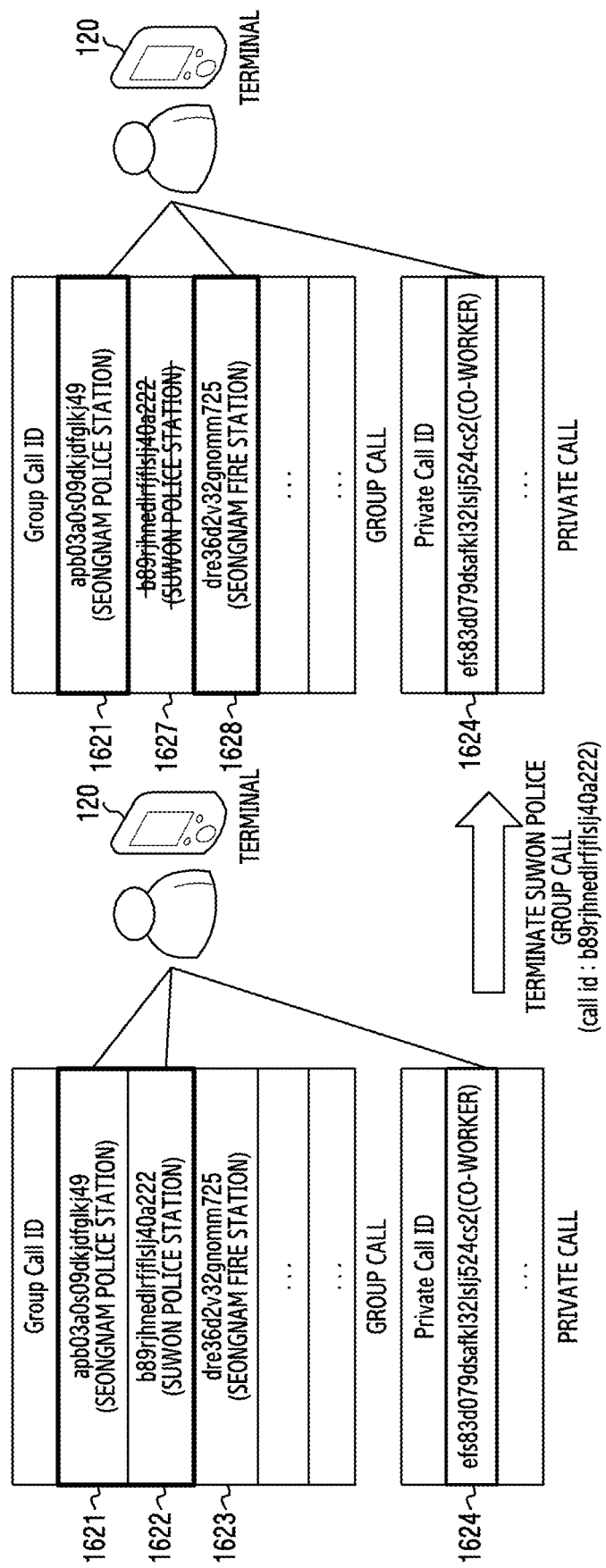
FIG. 16 illustrates the operation of managing a voice service according to various embodiments.

FIG. 16 illustrates the operation of managing a voice service according to various embodiments.

Referring to FIG. 16, the terminal 120 may individually manage a group call and a private call. It is assumed that the number of services, which can be simultaneously supported by the group call, is 2 and the number of services, which can be simultaneously supported by the private call, is 1. Although the drawings illustrate that the group call and the private call are managed by the terminal 120, service information for managing the group call and the private call may be managed by a service that provides a service or a terminal that receives a service. Simultaneously performed services may be divided according to the service type. For example, when the performed services are voice services, the services may be managed while being divided into a private call and a group call. Alternatively, the services may be managed while being integrated into one voice service. Such division may vary depending on the limit on the number of services which can be simultaneously provided. In a scheme in which services are divided into the private call and the group call based on the limit on the number of services which can be simultaneously provided, information on the services being performed is managed while being divided.

The technology for services, which can be simultaneously supported, according to various embodiments of the present disclosure may be applied to the MCPTT field. FIG. 16 illustrates various embodiments of the present disclosure based on an MCPTT voice service. However, the technology is not limited to the MCPPT technical field. A server that provides the MCPTT voice service manages information on a call (service) currently being performed by the terminal 120. The server may be the server 110. For example, the terminal 120 may be currently connected to 3 group calls and 1 private call. It is assumed that the number of group calls, which can be simultaneously supported, is 2 according to the limit on the number of calls, which can be simultaneously supported based on an MCPTT service network environment.

In FIG. 16, the number of currently performed group calls is 3 but the number of group calls, in which the terminal 120 joins, is 2. If one of the 2 group calls, in which the terminal 120 joins, is terminated after a predetermined time, the terminal 120 can join in another group call. At this time, the server 110 (for example, MCPTT server) may notify the terminal 120 of information on the group call, in which the terminal 120 joins next. Based on a membership level of the user using the terminal 120, subscription information of the user, and the type/function of the terminal 120, the server 110 may determine a group call, in which the terminal 120 joins next. Alternatively, when priorities of the group calls, which are currently performed by the terminal 120, are changed, the currently joined group call may be changed. For example, when a priority of the currently joined group call is lowered or a priority of the currently standing group call becomes higher than that of the currently performed group call, the joined group calls may be changed. At this time, as information for determining a group call to be joined next or a priority of the group call, a call type (normal call and emergency call), a media type (voice, text, and image), a priority of the user, and a priority of a member joining in the group call may be included. Such change operations may be performed by the terminal 120 or the server 110.

When the MCPTT technology provided in the disaster safety network system is considered, a method and an apparatus for limiting the number of calls (services) which can be simultaneously provided by the terminal 120 and managing the currently performed services in terms of the server 110 or the terminal 120 of the method described in the present disclosure can be realized. By using the method described in the present disclosure, the user may preferentially join in the most urgent situation service and, when a call ends, join in a service corresponding to the next priority.

Figure 17:
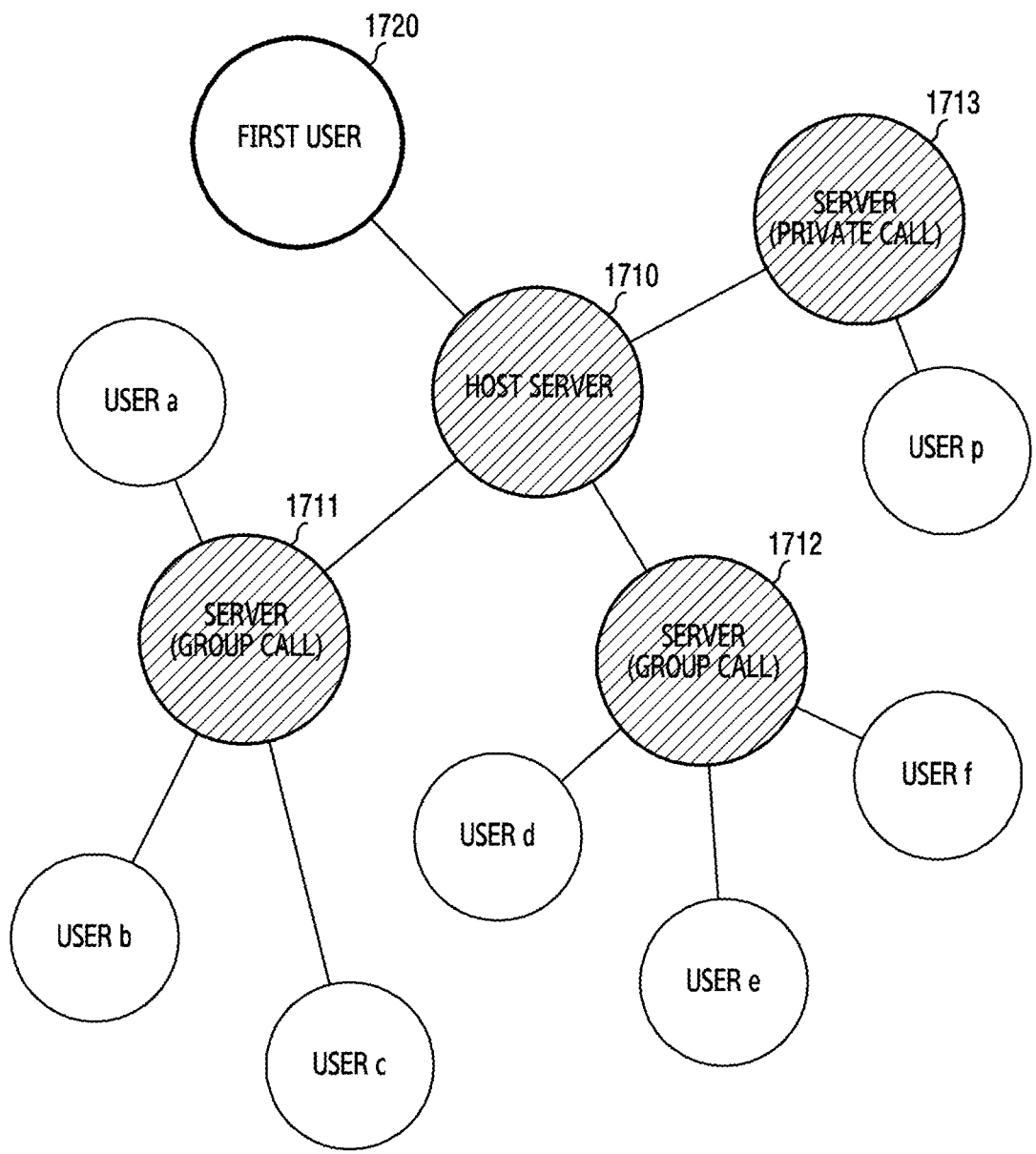
FIG. 17 illustrates the terminal, the server, another terminal, and another server according to various embodiments.

FIG. 17 illustrates a terminal, a server, another terminal, and another server according to various embodiments. In the following description of FIG. 17, a service is described as a service for providing media, but is not limited to a service that provides the media.

Referring to FIG. 17, a first user may join in one or more services through a terminal 1720. For example, the first user may join in 2 group calls and 1 private call. There may be a hosting server 1710 that provides a service to the first user. Further, there may be a server 1711 and a server 1712 that control the 2 group calls and a server 1713 that controls the 1 private call. The hosting server 1710 may be a server such as the server 1711, the server 1712, or the server 1713, or may be another server. Hereinafter, in this document, the server 1711, the server 1712, the server 1713, and the hosting server 1710 may be the same server unless otherwise specified.

The server that controls the "group call" or the "private call" (hereinafter, referred to as a "call") may control a right to speak such that one of the users who joins in the call can speak. Further, when the user joins in a plurality of calls, the server may control a right to speak such that the user speaks in only one call. Even though the user simultaneously joins in several calls, a service provider may control the number of calls through which media can be transmitted or controlled. For example, when the first user joins in 3 calls, a service may have a requirement to allow media to be received in all calls but transmitted only in 1 call. In order to meet the service requirement, the servers or the terminal may manage a plurality of users.

In order to perform control such that the user who joins in a plurality of calls transmits media only in 1 call, the server 1710 may control a right to speak or control traffic. A method of controlling the right to speak may be referred to as a floor control, and a method of controlling the traffic may be referred to as a bearer control.

According to the floor control, when the first user speaks in a first group call and then makes a request for speaking in a second group call, the server 1710 may check if the first user speaks in another call, and identify that the first user speaks in the other call, that is, the first call, and then withdraw the right to speak in the first call. Thereafter, the server 1710 may give a right to speak in the second group call, so that the first user can transmit media only in the second group call.

According to another method of the floor control, the terminal 1720 may manage the plurality of users. In order to speak in the second group call, the first user may transmit a request message indicating that the user does not speak in the first group call anymore to the server 1710 before making a request for the right to speak, and then make a request for the right to speak in the second group call.

Further, the first user may speak in the private call while speaking in the first group call. The floor control may be used in the group call. When a plurality of users simultaneously speak, the server that manages the group call may have difficulty in easily managing and delivering a plurality of statements. Accordingly, the floor control in which the right to speak is given to one user and withdrawn may be used.

According to the bearer control, after transmitting a request message indicating that the first user does not speak anymore in the first group call to the server 1710, the first user may speak in the private call. In the private call, the bearer control is generally used but the floor control may be used.

As described above, the description has been made on the premise that the first user speaks only in one group call or one private call, but the first user may simultaneously speak in all group calls or some group calls. In the case of public interests and emergency situations, all users within a plurality of group calls may need to speak. In this case, the first user may simultaneously speak in the plurality of group calls. Further, for a plurality of calls, the first user may select some of the plurality of calls and may select and transmit media. When a plurality of calls are transmitted from the plurality of calls, the server may select at least one of the plurality of media.

Figure 18:
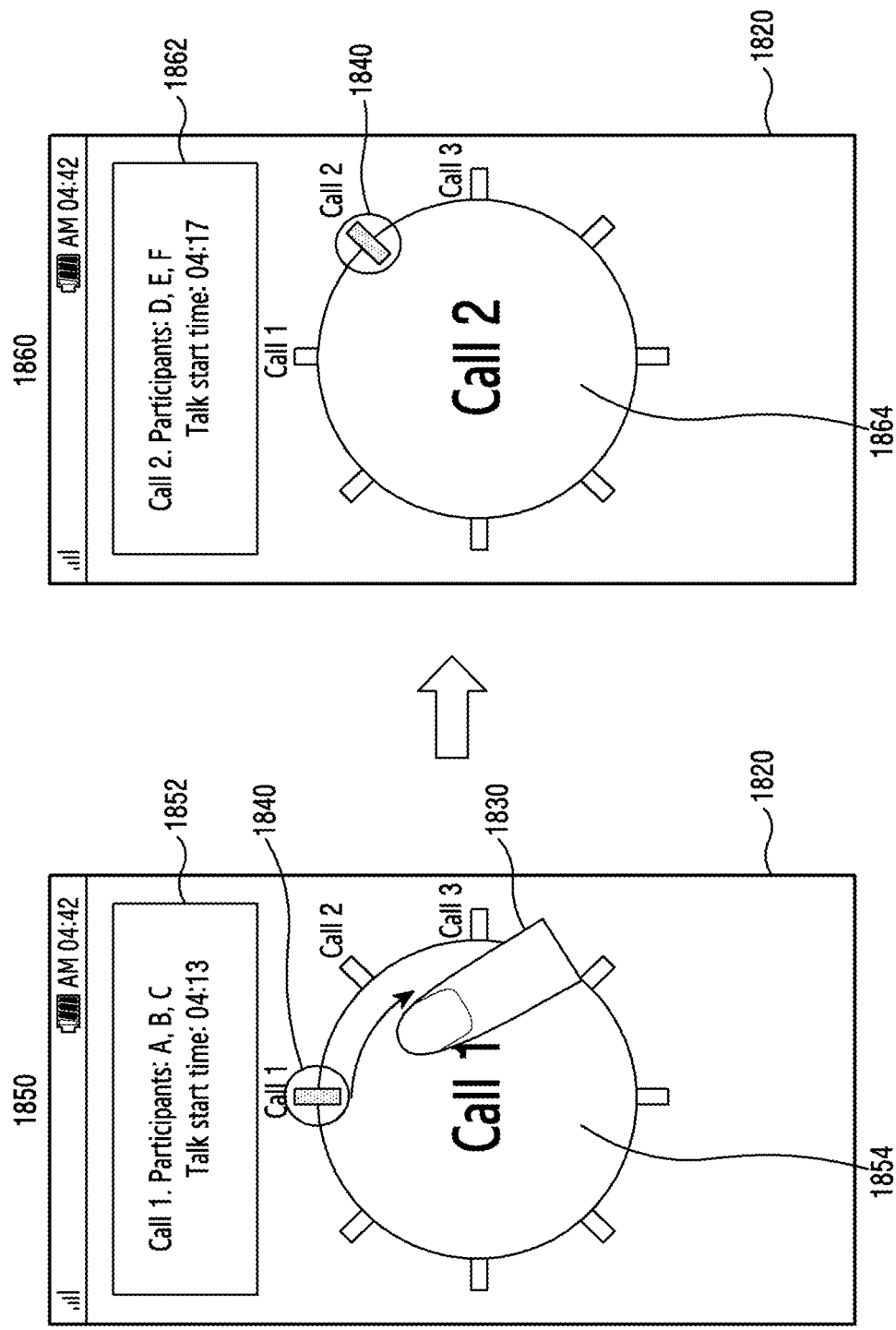
FIG. 18 illustrates a User Interface (UI) that manages services connected to the terminal.

FIG. 18 illustrates a User Interface (UI) that manages services connected to the terminal. The UI may display various pieces of information related to a service being provided. For the UI, a list type, a tab type, a grid type, or a one-button dial may be considered. When an exchanged service is a voice service, the UI may show group call information in an address book type. At this time, since the group call information includes dynamically changing information, an address book of the terminal may be linked to the network and thus updated periodically or according to a set time. The information may include information on participants in a group call, whether a private call with one of the participants is possible, whether a user who currently joins in the group is interested in the group, whether a group call is being currently performed, information on a person who currently speaks when the group call is being performed, whether a group call can be configured when the group call is not performed, a start time when a group call is scheduled to be performed, and a button for setting an alarm before the start time. FIGS. 18 to 22 are described based on the call, but not limited thereto.

Referring to FIG. 18, the terminal may include a display unit 1820. The display unit 1820 is illustrated as a one-button dial. The display unit 1820 may include an indicator 1840, a box 1852, and a button 1854. A detailed operation of a setup input 1830 may be determined according to user's action. The button 1854 may transfer a particular command to the terminal in response to the setup input 1830. A screen 1850 may be a screen before the particular command is transferred and a screen 1860 may be a screen after the particular command is transferred.

Like in the embodiment of FIG. 18, it is possible to select one of a plurality of calls through the one-button dial. The one button may correspond to the button 1854. In a method of selecting the call, the one-button dial may rotate in a left direction (for example, clockwise direction) or a right direction (for example, a counterclockwise direction). Information on the selected call may be displayed on the screen. In FIG. 18, a box 1852 may indicate information on the selected call. The information may include participants who join in the service and a start time of the service. Although not illustrated in FIG. 18, an image related to the current call may be displayed as an image of the button 1854. For example, a police station image may be displayed when a police group call is selected by the input 1830 through the button 1854, and a fire station image may be displayed when a firefighting group call is selected. Further, when the button 1854 is clicked or double-clicked by the input 1830, several operations may be performed. For example, before the terminal makes a call with the server, when the button 1854 is clicked once by the input 1830, the call starts and, when the button is pressed once more, the call ends. During the call between the terminal and the server, when the button 1854 is clicked once by the input 1830, speaking is performed, when the button is clicked once more, the speaking ends, and, when the button is double-clicked, a mute function is performed. Although not illustrated in FIG. 18, other buttons than the one button may be added. The other buttons may include a media transmission button and a current call recording button.

In FIG. 18, the indicator 1840 currently indicates call 1. When the setup input 1830 is a touch input of rotating in a clockwise direction or a counterclockwise direction and a touch input of making the indicator 1840 move in a clockwise direction is performed, the indicator 1840 may indicate call 2 on the screen 1860. According to the indicator 1840, the screen of the box 1852 may be changed. The box 1852 may be changed from information on call 1 into information on call 2.

Figure 19:
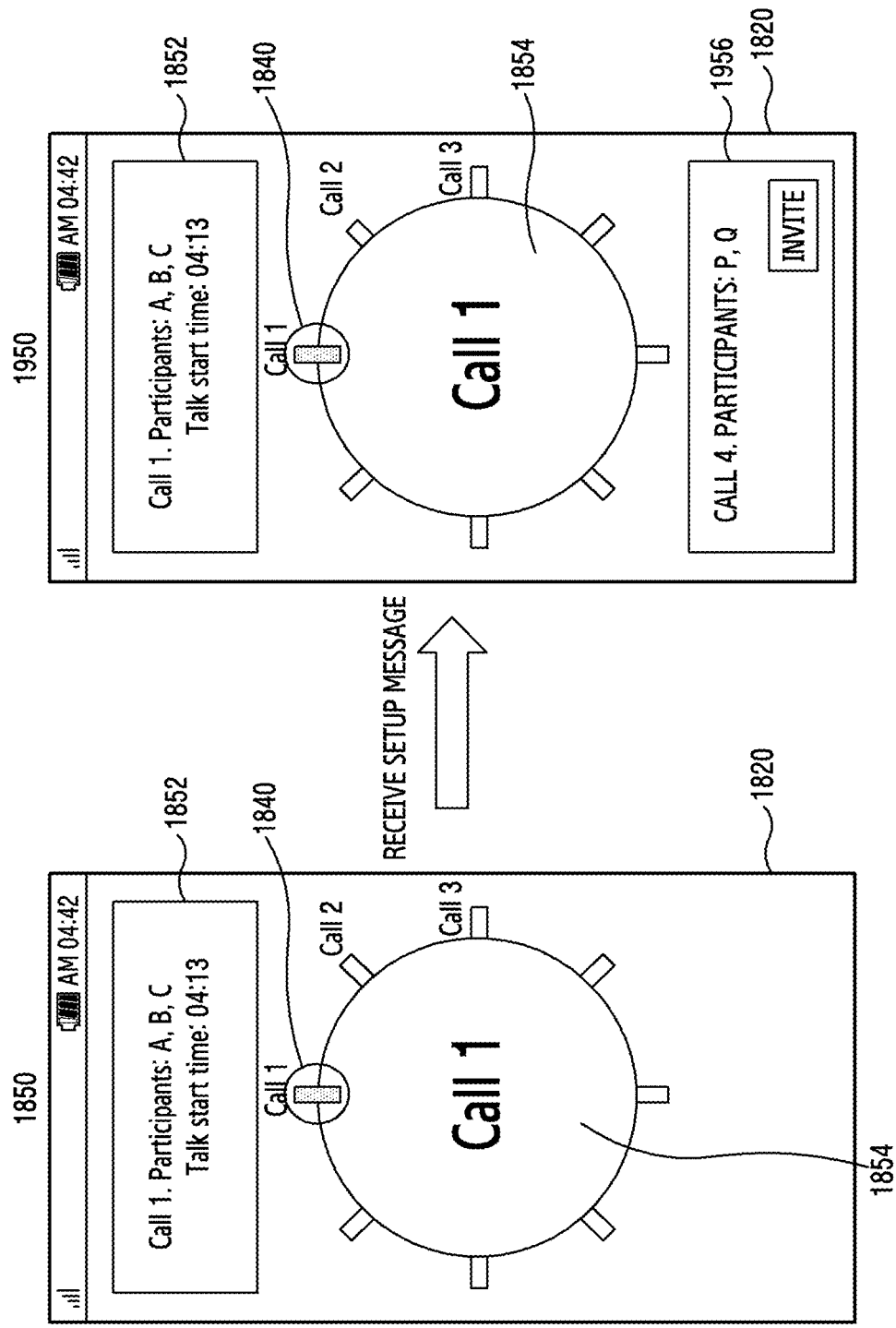
FIG. 19 illustrates a one-button dial user interface according to various embodiments.

FIG. 19 illustrates a one-button dial user interface according to various embodiments.

Referring to FIG. 19, the terminal may include a display unit 1820. The display unit corresponds to the display unit of FIG. 18. The display unit 1820 may include an indicator 1840, a box 1852, and a button 1854. Further, the display unit 1820 may include a notification box 1956. A screen 1850 may be a screen before an input is transferred and a screen 1950 may be a screen after a setup message is received.

According to various embodiments of the present disclosure, the notification box 1956 may include information on the first service 118 of FIG. 1. When the setup message for the first service 118 is received from the server, the screen 1850 may be changed into the screen 1950. In response to the reception of the setup message, the notification box 1956 may be displayed on the screen 1950. On the screen 1950, the notification box 1956 may include an invitation button. When a touch input is performed on the invitation button, the terminal may transmit an invitation message for configuring a session for the first service to the server.

According to various embodiments of the present disclosure, the setup message may be a notification message. In response to the notification message, the box 1956 may be displayed on the screen 1950. When the terminal waits for termination of another call (service), the invitation message may not be pressed. Accordingly, the terminal may actively transmit the invitation message to the server according to the selection by the user of the terminal. The invitation message may be the SIP INVITE message. Contents contained in the notification box 1956 are not limited to the information on the first service. Although not illustrated in FIG. 19, information on a call being performed currently and information on a call not being performed currently may be displayed in the notification box 1956.

Figure 20:
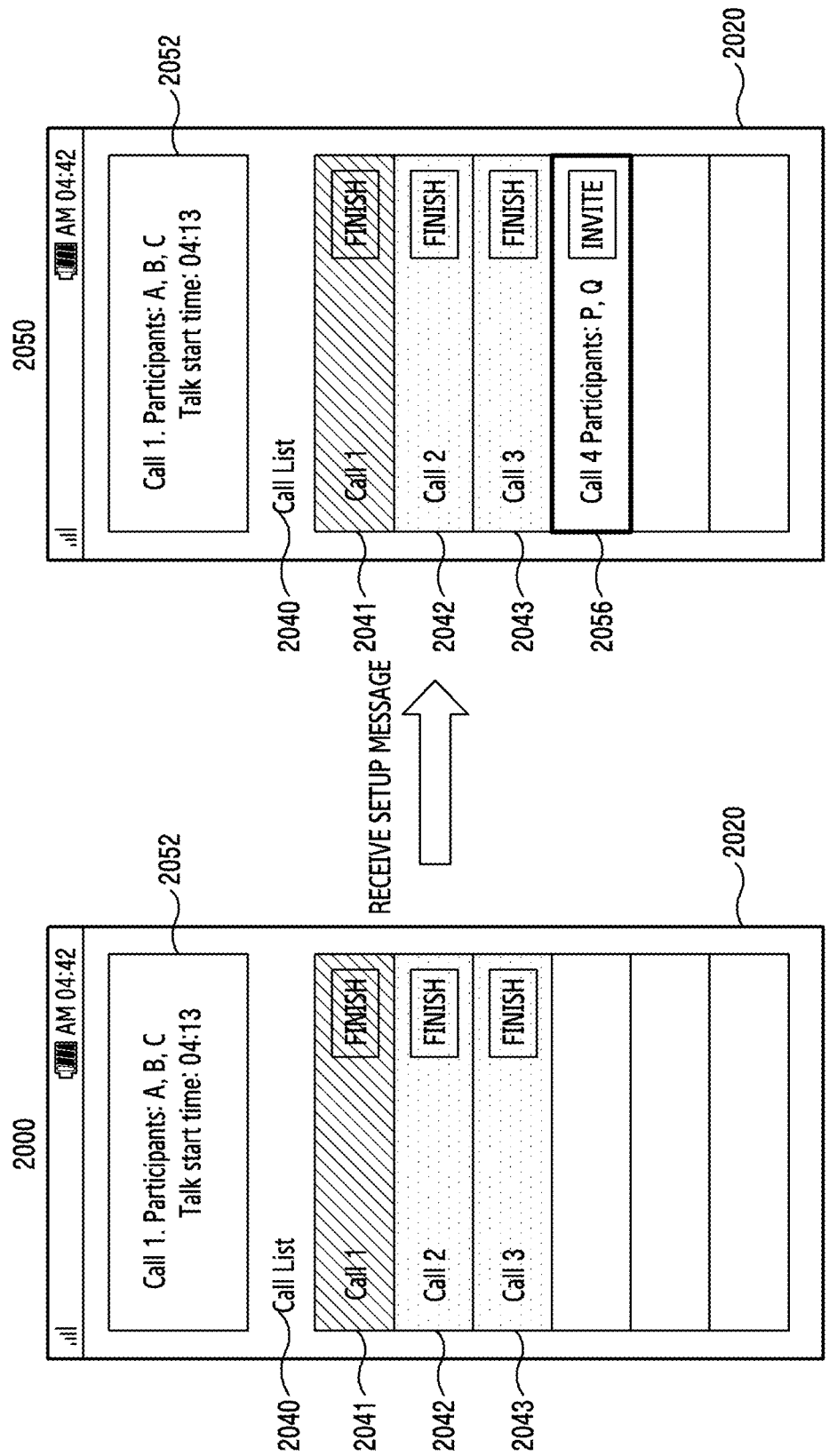
FIG. 20 illustrates a list type user interface according to various embodiments.

FIG. 20 illustrates a list type user interface according to various embodiments.

Referring to FIG. 20, the terminal may include a display unit 2020. The display unit 2020 is illustrated in a list type. The display unit 2020 may include a call (service) list 2040 and a box 2052. The call list 2040 may include list elements 2041, 2042, and 2043 corresponding to call 1, call 2, and call 3, respectively. In FIG. 20, the display unit 2020 displays a screen on which the list element 2041 is selected. In response to the selection of the list element 2041, the display unit 2020 may display information on call 2 in the box 2052. The list elements 2041, 2042, and 2043 may transfer particular commands to the terminal according to a setup input by the user. For example, although not illustrated in FIG. 20, the display unit 2020 may display a screen on which the list element 2042 is selected according to a setup input by the user. In this case, the box 2052 may be changed to display information on call 2 corresponding to the list element 2042. The setup input may be an input of pressing an area corresponding to the list element.

Each of the list elements 2041, 2042, and 2043 may have an end button. Accordingly, the user may actively manage calls (services) in a specific situation as well as reception of a new call. For example, a lack of a residual battery and an offline condition may be considered as the specific situation. The user may actively end a particular call according to user's selection through the end button. Although not illustrated in FIG. 20, the call list 2040 may include other buttons in addition to the end button. The other buttons may include a media transmission button and a current call recording button.

The call list 2040 may include a list element 2056 corresponding to call 4. A screen 2000 may be a screen before an input is transferred and a screen 2050 may be a screen after a configuration message is received. The call list 2040 is illustrated to include six list elements, but is not necessarily limited thereto. Fewer calls or more calls may be allowed. Such a setup may be defined in advance.

According to various embodiments of the present disclosure, the list element 2056 may include information on the first service 118 of FIG. 1. When the setup message for the first service 118 is received from the server, the screen 2000 may be changed into the screen 2050. In response to the reception of the setup message, the list element 2056 may be displayed on the screen 2050. According to the operation of receiving the setup message, the list element 2056 may be included in the call list 2040. The list element 2056 may include an invitation button. When a touch input is performed on the invitation button, the terminal may transmit an invitation message for configuring a session for the first service from the server.

According to various embodiments of the present disclosure, the setup message may be a notification message. In response to the notification message, the list element 2056 may be displayed on the screen 2050. When the terminal waits for termination of another call (service), the invitation button may not be pressed. Accordingly, the terminal may actively transmit the invitation message to the server according to the selection by the user of the terminal. The invitation message may be the SIP INVITE message. Contents contained in the list element 2056 are not limited to the information on the first service. Although not illustrated in FIG. 20, information on a call being performed currently and information on a call not being performed currently may be displayed in the call list 2040.

Figure 21:
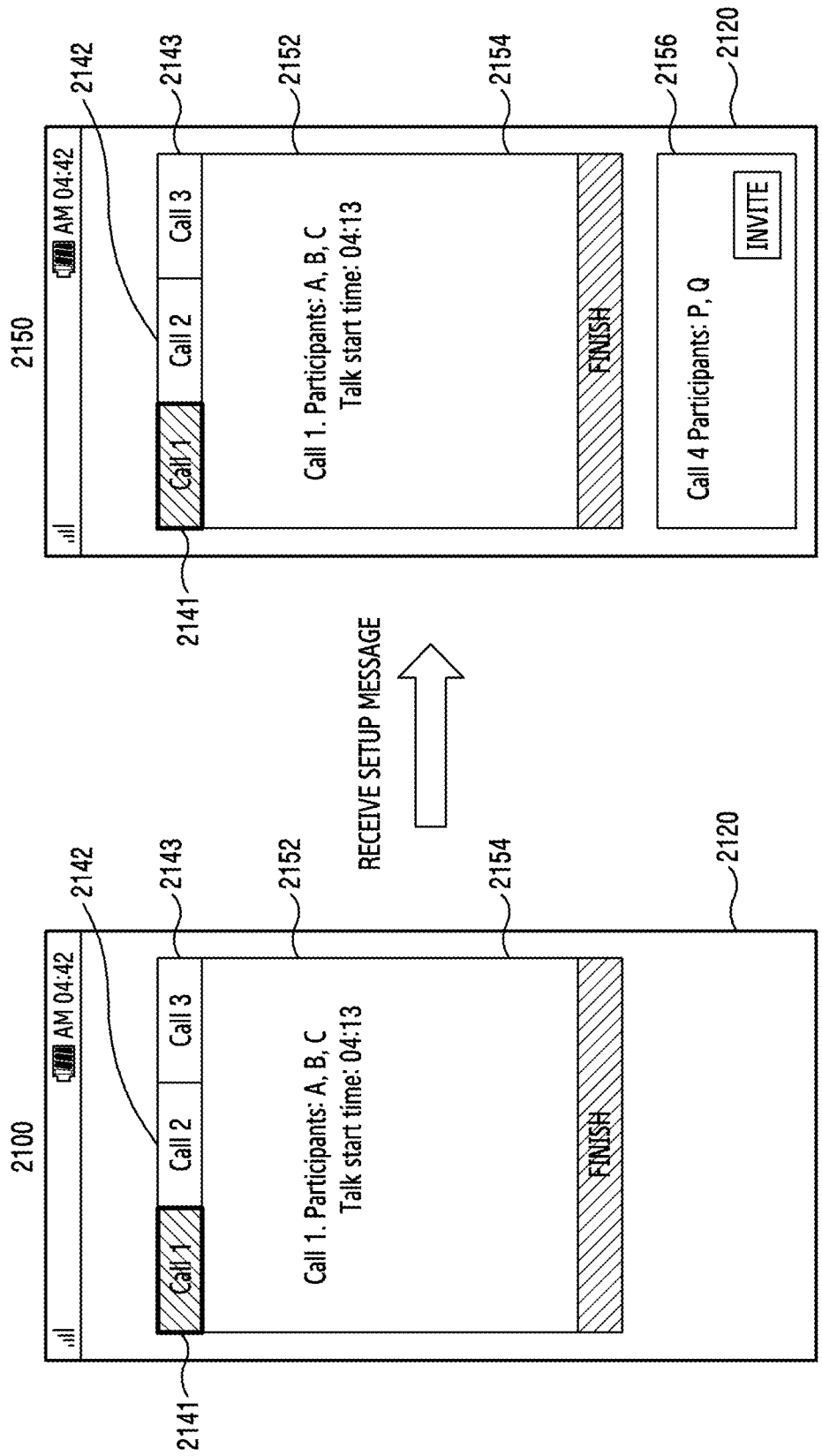
FIG. 21 illustrates a tab type user interface according to various embodiments.

FIG. 21 illustrates a tab type user interface according to various embodiments.

Referring to FIG. 21, the terminal may include a display unit 2120. The display unit 2120 may be illustrated in a tab type. The display unit 2120 may include a tab element 2141, a tab element 2142, a tab element 2143, a tab box 2152, and an end button 2154. The tab element 2141 may correspond to call 1, the tab element 2142 may correspond to call 2, and the tab element 2143 may correspond to call 3. In FIG. 21, the display unit 2120 displays a screen on which the tab element 2141 is selected. According to the selection of the tab element 2141, the display unit 2120 may display information on call 1 in the tab box 2152. The tab elements 2141, 2142, and 2143 may be used to transfer particular commands to the terminal in response to a user's setup input. For example, although not illustrated in FIG. 21, the display unit 2120 may display a screen on which the tab element 2142 is selected in response to the user's setup input. In this case, the tab box 2152 may be changed to display information on call 2 corresponding to the tab element 2142. The setup input may be an input of pressing an area corresponding to the tab element.

The display unit 2120 may have an end button 2154. A call on which information is displayed in the tab box 2152 may be a currently selected call. When an input of pressing the area corresponding to the end button 2154 is performed, the selected call (service) may end. Accordingly, the user may actively manage calls (services) in a specific situation as well as reception of a new call. For example, a lack of a residual battery and an offline condition may be considered as the specific situation. The user may actively end a particular call according to user's selection through the end button. Although not illustrated in FIG. 21, other buttons as well as the end button may be added in the display unit 2120. The other buttons may include a media transmission button and a current call recording button. A screen 2100 may be a screen before an input is transferred and a screen 2150 may be a screen after a configuration message is received. The display unit 2120 is illustrated to include three tab elements, but is not necessarily limited thereto. Fewer calls or more calls may be allowed. Such a setup may be defined in advance.

According to various embodiments of the present disclosure, an alarm box 2156 may include information on the first service 118 of FIG. 1. When the setup message for the first service 118 is received from the server, the screen 2100 may be changed into the screen 2150. In response to the reception of the setup message, the alarm box 2156 may be displayed on the screen 2150. The alarm box 2156 may include an invitation button. When a touch input is performed on the invitation button, the terminal may transmit an invitation message for configuring a session for the first service from the server.

According to various embodiments of the present disclosure, the setup message may be a notification message. In response to the notification message, the alarm box 2156 may be displayed on the screen 2150. When the terminal waits for termination of another call (service), the invitation button may not be pressed. Accordingly, the terminal may actively transmit the invitation message to the server according to the selection by the user of the terminal. The invitation message may be the SIP INVITE message. Contents contained in the alarm box 2156 are not limited to the information on the first service. Although not illustrated in FIG. 21, information on a call being performed currently and information on a call not being performed currently may be displayed in the alarm box 2156.

Figure 22:
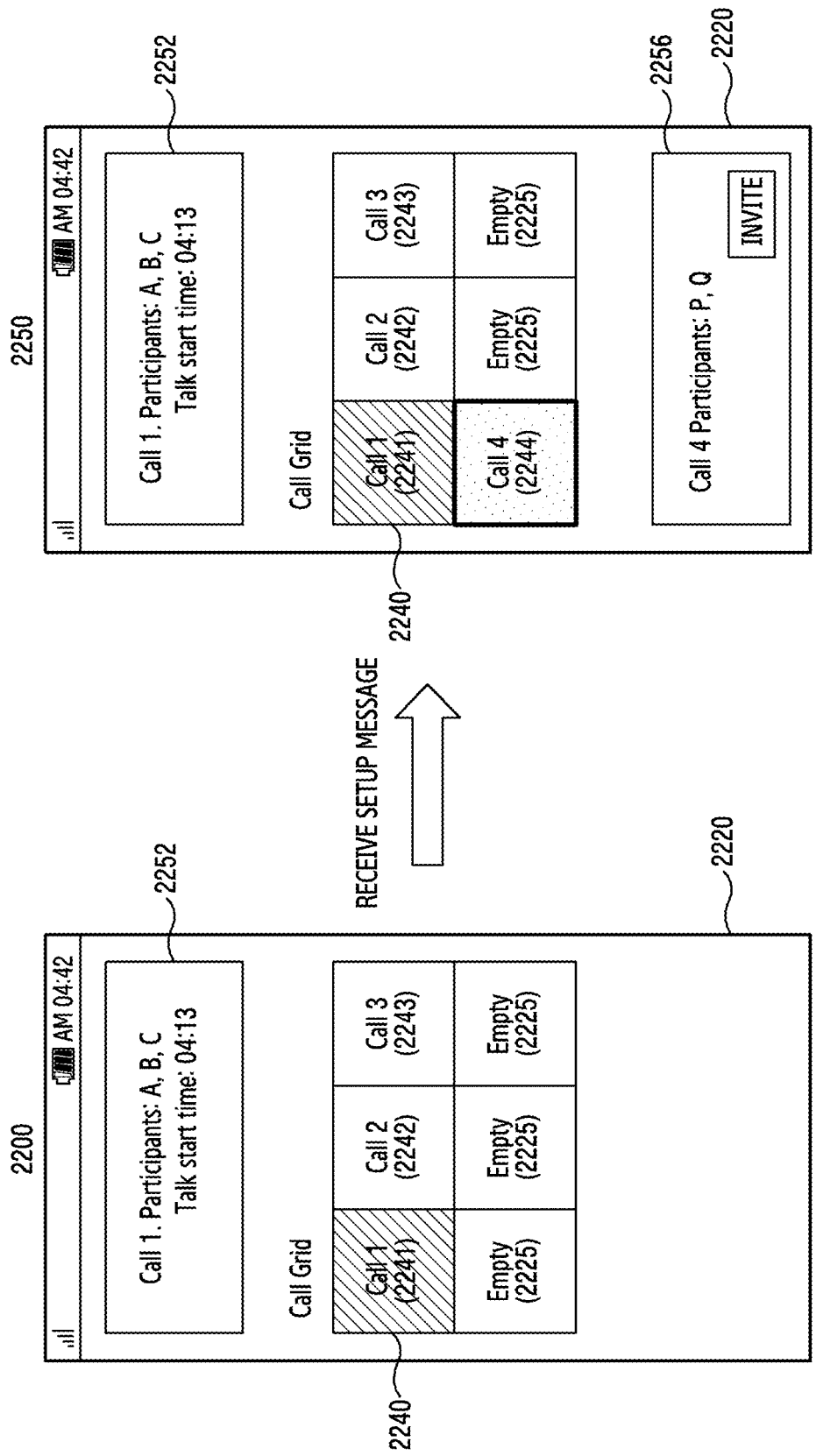
FIG. 22 illustrates a grid type user interface according to various embodiments.

FIG. 22 illustrates a grid type user interface according to various embodiments.

Referring to FIG. 22, the terminal may include a display unit 2220. The display unit 2220 is illustrated in a grid type. The display unit 2220 may include a grid 2240 and a box 2252. The grid 2240 may include a grid element 2241, a grid element 2242, and a grid element 2243. The grid element 2241 may correspond to call 1, the grid element 2242 may correspond to call 2, and the grid element 2243 may correspond to call 3. In FIG. 22, the display unit 2220 illustrates a screen on which the grid element 2241 is selected. According to the selection of the grid element 2241, the display unit 2220 may display information on call 1 in the box 2252. The grid elements 2141, 2142, and 2143 may transfer particular commands to the terminal according to a user's setup input. For example, although not illustrated in FIG. 22, the display unit 2220 may display a screen on which the grid element 2242 is selected according to the user's setup input. In this case, the box 2252 may be changed to indicate information on call 2 corresponding to the grid element 2242. The setup input may be an input of pressing an area corresponding to the grid element.

Each of the areas corresponding to the grid elements 2241, 2242, and 2243 may have an end function. Accordingly, the user may actively manage calls (services) in a specific situation as well as reception of a new call. For example, a lack of a residual battery and an offline condition may be considered as the specific situation. The user may actively end a particular call according to the user's election through the end function. When a setup input of pressing the grid element of the selected call is performed, the selected call may end. Such a setup may be differently defined. Although not illustrated in FIG. 20, other buttons as well as the grid elements may be added. The other buttons may include a media transmission button and a current call recording button.

The grid 2240 may include a grid element 2244 corresponding to call 4. A screen 2200 may be a screen before an input is transferred and a screen 2250 may be a screen after a configuration message is received. The grid 2240 may indicate a call (service) which can be further received at present. In FIG. 22, grid elements corresponding to available resources are illustrated as grid elements 2225. Thereafter, in response to the response to the setup message, one of the grid elements 2225 may include the grid element 2244 corresponding to the new call. The grid 2240 is illustrated to include six list elements, but is not necessarily limited thereto. Fewer calls or more calls may be allowed. Such a setup may be defined in advance.

According to various embodiments of the present disclosure, the alarm box 2256 may include information on the first service 118 of FIG. 1. When the setup message for the first service 118 is received from the server, the screen 2200 may be changed into the screen 2250. In response to the reception of the setup message, the alarm box 2256 may be displayed on the screen 2250. In response to the reception of the setup message, the grid element 2244 may be included in the grid 2240. The alarm box 2256 may include an invitation button. When a touch input is performed on the invitation button, the terminal may transmit an invitation message for configuring a session for the first service from the server.

According to various embodiments of the present disclosure, the setup message may be a notification message. In response to the notification message, the alarm box 2256 may be displayed on the screen 2250. In response to the notification message, the grid element 2244 may be displayed on the screen 2250. When the terminal waits for termination of another call (service), the invitation button may not be pressed. Accordingly, the terminal may actively transmit the invitation message to the server according to the selection by the user of the terminal. When the invitation message is not pressed, the grid element 2244 may not be activated. That is, the grid element 2244 may display information on call 4 in the box 2252 or perform an end function according to a setup input. The invitation message may be the SIP INVITE message. Contents contained in the alarm box 2256 are not limited to the information on the first service. Although not illustrated in FIG. 22, information on a call being performed currently and information on a call not being performed currently may be displayed in the alarm box 2256.

The simultaneous service supporting technology of the terminal and the server according to various embodiment of the present disclosure can be applied to a commercial service field. For example, the method proposed by the present disclosure may be used to simultaneously provide several voice services to the terminal. Alternatively, the method proposed by the present disclosure may be used to simultaneously provide several chatting services to the terminal. Alternatively, the method proposed by the present disclosure may be used to simultaneously provide several video services to the terminal.

As described above, the limit on the number of calls simultaneously provided to the terminal may cause by the restriction of terminal capability or network resources. Further, the simultaneous service supporting technology may be provided to a situation where the MCPTT service and the commercial service can be simultaneously provided. When the terminal is used for the MCPTT service and the commercial service at the same time, processing of the MCPTT may have priority even though the commercial service is being performed in various embodiments of the present disclosure. That is, the priority of the MCPTT service may be set to be higher than other services in various embodiments of the present disclosure.

A method of operating a server according to various embodiments may include a process of receiving a request for providing a first service to a terminal from another device while at least one service is connected to the terminal, a process of determining whether the first service can be provided to the terminal in response to the request, a process of, when one of the at least one service is terminated, determining whether to terminate one of the at least one service when the first service cannot be provide, and a process of, when one of the at least one service is terminated, transmitting a setup message for the first service to the terminal in response to the termination, The process of determining whether to terminate one of the at least one service may include a process of selecting one of the first service and a second service, which is one of the at least one service, based on priority information and a process of, when the second service is selected, terminating the second service in response to the selection.

The priority information may include at least one of a type of a service provided to the terminal, subscription information of the terminal, a type of the terminal, and a function of the terminal.

The process of determining whether to terminate one of the at least one service may include a process of selecting one of the first service and a second service, which is one of the at least one service, based on priority information and a process of, when the first service is selected, waiting for termination of one of the at least one service.

The method may further include a process of storing information on the first service in response to the selection.

The method may further include a process of receiving an invitation message corresponding to the setup message from the terminal and a process of transmitting a setup completion message to the terminal in response to the invitation message, wherein the setup message may be a notification message.

The method may further include a process of receiving a setup completion message from the terminal in response to the setup message, wherein the setup message may be an invitation message.

A method of operating a terminal according to various embodiments may include a process of receiving a notification message for a first service from a server, a process of determining whether the first service can be provided in response to the notification message, a process of, when the first service cannot be provided, determining whether to terminate one of at least one service connected to the terminal, a process of, when one of the at least one service is terminated, transmitting an invitation message for the first service to the server in response to the termination, and a process of receiving a setup completion message corresponding to the invitation message.

The process of determining whether to terminate one of the at least one service may include a process of selecting one of the first service and a second service, which is one of the at least one service, based on priority information and a process of, when the second service is selected, terminating the second service in response to the selection.

The priority information may include at least one of a type of a service provided to the terminal, subscription information of the terminal, a type of the terminal, and a function of the terminal.

The process of determining whether to terminate one of the at least one service may include a process of selecting one of the first service and a second service, which is one of the at least one service, based on priority information and a process of, when the first service is selected, waiting for termination of one of the at least one service.

The method may further include a process of storing the first service in response to the selection.

The server may be a server supporting MCPTT.

The method may further include a process of displaying information on at least one service connected to the terminal.

The method may further include a process of displaying a button, a process of detecting a setup input of the button, and a process of, in response to the setup input of the button, when the setup input is a first setup input, displaying information on a service selected by an indicator among at least one service connected to the terminal.

The method may further include a process of, in response to the setup input of the button, when the setup input is a second setup input, terminating a service selected by the indicator among at least one service connected to the terminal.

The first setup input may be an input of moving from a location of the indicator on the button in a clockwise direction or a counterclockwise direction, and the second setup input may be an input of pressing the button.

The method may further include a process of displaying information on the first service in response to the reception of the notification message.

The method may further include a process of displaying an invitation button, a process of detecting a setup input of the invitation button, and a process of transmitting the invitation message for the first service in response to the setup input of the invitation button.

The method may further include a process of displaying a list including information on at least one service connected to the terminal, a process of detecting a setup input of a list area or an end area which is a part of the displayed list, a process of, in response to the setup input of the list area, displaying information on a service corresponding to the list area among the at least one service, and a process of, in response to the setup input of the end area, terminating a service corresponding to the end area among the at least one service, wherein the setup input may be a press input.

The method may further include a process of displaying information on the first service in response to the reception of the notification message, a process of displaying an invitation button, a process of detecting a setup input of the invitation button, and a process of transmitting the invitation message for the first service in response to the setup input of the invitation button.

A server according to various embodiments may include a receiver configured to receive a request for providing a first service to a terminal from another device, a controller configured to determine whether the first service can be provided to the terminal in response to the request and determine whether to terminate one of at least one service connected to the terminal, and a transmitter configured to, when one of the at least one service is terminated, transmitting a setup message for the first service to the terminal in response to the termination.

The controller may be configured to select one of the first service and a second service, which is one of the at least one service, based on priority information and, when the second service is selected, terminate the second service in response to the selection.

The priority information may include at least one of a type of a service provided to the terminal, subscription information of the terminal, a type of the terminal, and a function of the terminal.

The controller may be configured to select one of the first service and a second service, which is one of the at least one service, based on priority information and, when the first service is selected, wait for termination of one of the at least one service.

The server may further include a memory configured to store information on the first service in response to the selection.

The receiver may be additionally configured to receive an invitation message corresponding to the setup message from the terminal, and the transmitter may be additionally configured to transmit a setup completion message to the terminal in response to the invitation message, wherein the setup message may be a notification message.

The receiver may be additionally configured to receive a setup completion message from the terminal in response to the setup message, wherein the setup message may be an invitation message.

A terminal according to various embodiments may include a receiver configured to receive a notification message for a first service from a server, a controller configured to determine whether the first service can be provided in response to the notification message and, when the first service cannot be provided, determine whether to terminate one of at least one service connected to the terminal, and a transmitter configured to, when one of the at least one service is terminated, transmit an invitation message for the first service to the server in response to the termination and receive a setup completion message corresponding to the invitation message.

The controller may be configured to select one of the first service and a second service, which is one of the at least one service, based on priority information and, when the second service is selected, terminate the second service in response to the selection.

The priority information may include at least one of a type of a service provided to the terminal, subscription information of the terminal, a type of the terminal, and a function of the terminal.

The controller may be configured to select one of the first service and a second service, which is one of the at least one service, based on priority information and, when the first service is selected, wait for termination of one of the at least one service.

The terminal may further include a memory configured to store information on the first service in response to the selection.

The terminal may be a terminal supporting MCPTT.

The terminal may further include a display unit configured to display information on at least one service connected to the terminal.

The display unit may be additionally configured to display a button operationally corresponding to the controller, and the controller may be additionally configured to detect a setup input of the button. The display unit may be configured to, in response to the setup input of the button, when the setup input is a first setup input, display information on a service selected by an indicator among at least one service connected to the terminal.

The controller may be additionally configured to, in response to the setup input of the button, when the setup input is a second setup input, terminate a service selected by the indicator among at least one service connected to the terminal.

The first setup input may be an input of moving from a location of the indicator on the button in a clockwise direction or a counterclockwise direction, and the second setup input may be an input of pressing the button.

The display unit may be additionally configured to display information on the first service in response to the reception of the notification message.

The display unit may be additionally configured to display an invitation button, the controller may be configured to detect a setup input of the invitation button, and the transmitter may be configured to transmit the invitation message for the first service in response to the setup input of the invitation button.

The terminal may further include a display unit operationally coupled to the controller. The controller may be additionally configured to display a list including information on at least one service connected to the terminal, detect a setup input of a list area or an end area, which is a part of the display part, display information on a service corresponding to the list area among the at least one service in response to the setup input of the list area, and terminate a service corresponding to the end area among the at least one service in response to the setup input of the end area, wherein the setup input may be a pressing input.

The controller may be additionally configured to display information on the first service in response to the reception of the notification message, display an invitation button, detect a setup input of the invitation button, and transmit the invitation message for the first service in response to the setup input of the invitation button.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The embodiments disclosed in the present specifications and drawings are provided merely to readily describe and to help a thorough understanding of the present disclosure but are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. A method performed by a terminal, the method comprising:
   receiving a notification message for a mission critical push to talk (MCPTT) service from a MCPTT server while at least one service is being provided to the terminal;
   determining whether the MCPTT service is available or not on the terminal, based on the notification message comprising information on whether a number of bearers of the at least one service being provided to the terminal is at a maximum number or not;
   transmitting a setup message for the MCPTT service to the MCPTT server, based on identifying that the MCPTT service is available on the terminal;
   determining a low priority non-MCPTT service of the at least one service being provided to the terminal, based on identifying that the MCPTT service is not available on the terminal;
   terminating the low priority non-MCPTT service, based on determining that a priority of the low priority non-MCPTT service is lower than a priority of the MCPTT service; and
   transmitting a setup message for the MCPTT service to the MCPTT server, in response to termination of the low priority non-MCPTT service,
   wherein the maximum number is associated with a number of allocable bearers.

2. The method of claim 1, further comprising:
   displaying a user interface (UI) including information regarding the at least one service being provided to the terminal;
   in response to detecting a first input for a service on the UI, displaying information on a service among the at least one service being provided to the terminal; and
   in response to detecting a second input for the service on the UI, terminating the service,
   wherein a floor control is used in a group call, and
   wherein the information regarding the service includes whether a user of the terminal is interested in a group of the service and information on a right to speak when the group call is being performed.

3. A terminal, comprising:
   at least one transceiver; and
   at least one processor operably coupled to the at least one transceiver, the at least one processor configured to:
   receive a notification message for a mission critical push to talk (MCPTT) service from a MCPTT server while at least one service is being provided to the terminal,
   determine whether the MCPTT service is available or not on the terminal, based on the notification message comprising information on whether a number of bearers of the at least one service being provided to the terminal is at a maximum number or not,
   transmit a setup message for the MCPTT service to the MCPTT server, based on identifying that the MCPTT service is available on the terminal,
   determine a low priority non-MCPTT service of the at least one service being provided to the terminal, based on identifying that the non-MCPTT service is not available on the terminal, terminate the low priority non-MCPTT service, based on determining that a priority of the low priority non-MCPTT service is lower than a priority of the MCPTT service, and transmit a setup message for the MCPTT service to the MCPTT server, in response to termination of the low priority non-MCPTT service, wherein the maximum number is associated with a number of allocable bearers.

4. The terminal of claim 3, further comprising:

a display operably coupled to the at least one processor, wherein the at least one processor is further configured to:

control the display to display a user interface (UI) including information regarding the at least one service being provided to the terminal, in response to detecting a first input for a service on the UI, display information on a service among the at least one service being provided to the terminal, and in response to detecting a second input for the service on the UI, terminate the service, wherein a floor control is used in a group call, and wherein the information regarding the service includes whether a user of the terminal is interested in a group of the service and information on a right to speak when the group call is being performed.

5. A mission critical push to talk (MCPTT) server, the MCPTT server comprising:

at least one transceiver; and at least one processor operably coupled to the at least one transceiver, the at least one processor configured to:

receive, from another device, a request for providing a MCPTT service to a terminal while at least one service is being provided to the terminal, determine whether the MCPTT service is available or not on the terminal, based on a notification message comprising information on whether a number of bearers of the at least one service being provided to the terminal is at a maximum number or not, transmit a setup message for the MCPTT service to the terminal, based on identifying that the MCPTT service is available on the terminal, determine a low priority non-MCPTT service of the at least one service being provided to the terminal, based on identifying that the non-MCPTT service is not available on the terminal, terminate the low priority non-MCPTT service, based on determining that a priority of the low priority non-MCPTT service is lower than a priority of the MCPTT service, and transmit a setup message for the MCPTT service to the MCPTT server, in response to termination of the low priority non-MCPTT service, wherein the maximum number is associated with a number of allocable bearers.

6. A method performed by a mission critical push to talk (MCPTT) server, the method comprising:

receiving, from another device, a request for providing a MCPTT service to a terminal while at least one service is being provided to the terminal;

determining whether the MCPTT service is available or not on the terminal, based on a notification message comprising information on whether a number of bearers of the at least one service being provided to the terminal is at a maximum number or not;

transmitting a setup message for the MCPTT service to the terminal, based on identifying that the MCPTT service is available on the terminal;

determining a low priority non-MCPTT service of the at least one service being provided to the terminal, based on identifying that the non-MCPTT service is not available on the terminal;

terminating the low priority non-MCPTT service, based on determining that a priority of the low priority non-MCPTT service is lower than a priority of the MCPTT service; and transmitting a setup message for the MCPTT service to the MCPTT server, in response to termination of the low priority non-MCPTT service, wherein the maximum number is associated with a number of allocable bearers.

7. The method of claim 6, wherein the terminating of the non-MCPTT service comprises:

identifying that a priority of the MCPTT service is higher than at least one priority of the at least one service being provided to the terminal based on priority information; and terminating the non-MCPTT service which is one of the at least one service based on the priority information.

8. The method of claim 1, wherein the maximum number is associated with a capability of the terminal, and wherein the terminal supports a MCPTT service and the MCPTT service comprises a MCPTT voice service.

9. The method of claim 1, wherein the maximum number is associated with a maximum number of simultaneous private calls or a maximum number of simultaneous group calls.

10. The terminal of claim 3, wherein the maximum number is associated with a capability of the terminal, and wherein the terminal supports a MCPTT service and the MCPTT service comprises a MCPTT voice service.

11. The terminal of claim 3, wherein the maximum number is associated with a maximum number of simultaneous private calls or a maximum number of simultaneous group calls.

12. The MCPTT server of claim 5, wherein the maximum number is associated with a capability of the terminal, and wherein the terminal supports a MCPTT service and the MCPTT service comprises a MCPTT voice service.

13. The MCPTT server of claim 5, wherein the maximum number is associated with a maximum number of simultaneous private calls or a maximum number of simultaneous group calls.

14. The method of claim 6, wherein the maximum number is associated with a capability of the terminal, and wherein the terminal supports a MCPTT service and the MCPTT service comprises a MCPTT voice service.

15. The method of claim 6, wherein the maximum number is associated with a maximum number of simultaneous private calls or a maximum number of simultaneous group calls.

* * * * *